(12) United States Patent
Speier et al.

(10) Patent No.: US 10,845,532 B2
(45) Date of Patent: Nov. 24, 2020

(54) WALL WASH LUMINAIRE WITH LIGHT GUIDE AND OPTICAL ELEMENT THEREFORE

(71) Applicant: Quarkstar LLC, Las Vegas, NV (US)

(72) Inventors: Ingo Speier, Saanichton (CA); Victor E. Isbrucker, Sturgeon Point (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 16/386,085

(22) Filed: Apr. 16, 2019

(65) Prior Publication Data

US 2020/0081179 A1 Mar. 12, 2020

Related U.S. Application Data

(63) Continuation of application No. 15/162,319, filed on May 23, 2016, now Pat. No. 10,267,979, which is a
(Continued)

(51) Int. Cl.
*F21V 8/00* (2006.01)
*F21V 21/26* (2006.01)
(Continued)

(52) U.S. Cl.
CPC ............ *G02B 6/0086* (2013.01); *F21S 8/026* (2013.01); *F21S 8/036* (2013.01); *F21S 8/06* (2013.01);
(Continued)

(58) Field of Classification Search
CPC .. G02B 6/0091; G02B 6/0011; G02B 6/0045; G02B 6/0073; G02B 27/0994;
(Continued)

(56) References Cited

U.S. PATENT DOCUMENTS 2,826,684 A 3/1958 Baker
4,232,361 A 11/1980 Kelsall
(Continued)

FOREIGN PATENT DOCUMENTS

CN 101228464 A 7/2008
CN 103858244 A 6/2014
(Continued)

OTHER PUBLICATIONS

Chinese Application No. 201580072796.4, Notification of First Office Action, dated Apr. 28, 2019, with translation, 15 pages.
(Continued)

*Primary Examiner* — Erin Kryukova
(74) *Attorney, Agent, or Firm* — Fish & Richardson P.C.

(57) ABSTRACT

A light shaping article includes a solid optic having a cross-sectional profile including an input interface; a convex output surface opposite the input interface; a concave first side surface extending between the input interface and the convex output surface; and a second side surface opposite the concave first side surface extending from between input interface to the convex output surface. The concave first side surface and the convex output surface are configured such that, when the solid optic receives input light having an input angular range in a plane of the cross-sectional profile, the solid optic guides the light to and emits the light from the output surface in an output angular range in the plane. A prevalent propagation direction of output light in the output angular range is tilted toward the second side surface relative to a prevalent propagation direction of input light in the input angular range.

18 Claims, 26 Drawing Sheets

Related U.S. Application Data continuation of application No. 14/692,550, filed on Apr. 21, 2015, now Pat. No. 9,348,080.

(60) Provisional application No. 62/081,482, filed on Nov. 18, 2014.

(51) Int. Cl.

| | | |
|---|---|---|
| *F21V 7/10* | (2006.01) | |
| *F21S 8/00* | (2006.01) | |
| *G02B 19/00* | (2006.01) | |
| *G02B 27/09* | (2006.01) | |
| *F21S 8/06* | (2006.01) | |
| *F21V 7/00* | (2006.01) | |
| *F21S 8/02* | (2006.01) | |
| *F21V 14/04* | (2006.01) | |
| *F21Y 115/10* | (2016.01) | |
| *G02F 1/13357* | (2006.01) | |

(52) U.S. Cl.
CPC .............. *F21V 7/00* (2013.01); *F21V 7/10* (2013.01); *F21V 14/04* (2013.01); *F21V 21/26* (2013.01); *G02B 6/003* (2013.01); *G02B 6/0011* (2013.01); *G02B 6/0023* (2013.01); *G02B 6/0051* (2013.01); *G02B 6/0063* (2013.01); *G02B 6/0068* (2013.01); *G02B 6/0073* (2013.01); *G02B 6/0085* (2013.01); *G02B 19/0028* (2013.01); *G02B 19/0066* (2013.01); *G02B 27/0994* (2013.01); *F21Y 2115/10* (2016.08); *G02B 6/0045* (2013.01); *G02F 2001/133607* (2013.01)

(58) Field of Classification Search
CPC .............. G02B 19/0028; G02B 6/0086; G02B 6/0063; G02B 6/0023; G02B 6/0085; G02B 6/003; G02B 6/0068; G02B 6/0051; G02B 19/0066; F21S 8/06; F21S 8/026; F21S 8/036; F21Y 2115/10; F21V 7/0091; F21V 7/00; F21V 7/10; F21V 14/04; F21V 21/26; G02F 2001/133617
See application file for complete search history.

(56) References Cited

U.S. PATENT DOCUMENTS

| | | | |
|---|---|---|---|
| 4,623,956 A | 11/1986 | Conti | |
| 4,933,822 A | 6/1990 | NakaMats | |
| 5,581,448 A | 12/1996 | Harwood | |
| 5,810,463 A | 9/1998 | Kawahara | |
| 6,058,271 A | 5/2000 | Tenmyo | |
| 6,203,174 B1 | 3/2001 | Plumeyer | |
| 6,364,510 B1 | 4/2002 | Bernhart et al. | |
| 6,598,998 B2 * | 7/2003 | West | H01L 33/58 257/E33.073 |
| 7,131,753 B1 | 11/2006 | Edwards | |
| 7,717,598 B2 | 5/2010 | Kakizaki | |
| 7,855,815 B2 | 12/2010 | Hayashide | |
| 7,874,696 B2 | 1/2011 | Engel | |
| 7,942,565 B2 | 5/2011 | Klick et al. | |
| 8,721,152 B2 | 5/2014 | Coleman | |
| 8,746,945 B2 | 6/2014 | Kim | |
| 8,899,808 B2 | 12/2014 | Speier | |
| 9,109,787 B2 | 8/2015 | Nankil | |
| 9,116,274 B2 | 8/2015 | Parker | |
| 10,274,159 B2 * | 4/2019 | Kim | F21V 5/04 |
| 2003/0193720 A1 | 10/2003 | Beach | |
| 2008/0204888 A1 | 8/2008 | Kan | |
| 2008/0232107 A1 | 9/2008 | Hsu | |
| 2009/0168395 A1 * | 7/2009 | Mrakovich | F21S 8/032 362/84 |
| 2010/0296283 A1 * | 11/2010 | Taskar | F21V 5/04 362/235 |
| 2011/0063870 A1 | 3/2011 | Nomoto | |
| 2011/0170278 A1 * | 7/2011 | Tordini | G02B 19/0095 362/84 |
| 2012/0307486 A1 | 12/2012 | Gordin | |
| 2013/0039050 A1 | 2/2013 | Dau et al. | |
| 2013/0039090 A1 | 2/2013 | Dau et al. | |
| 2013/0120974 A1 | 5/2013 | Swisha et al. | |
| 2013/0200818 A1 | 8/2013 | Cercone | |
| 2013/0208495 A1 | 8/2013 | Dau et al. | |
| 2014/0003039 A1 | 1/2014 | Steadman et al. | |
| 2014/0016326 A1 * | 1/2014 | Dieker | F21V 13/04 362/308 |
| 2014/0029276 A1 | 1/2014 | Leon | |
| 2014/0063812 A1 | 3/2014 | Geralds | |
| 2014/0160779 A1 | 6/2014 | Pusch et al. | |
| 2014/0313714 A1 | 10/2014 | Wassel | |
| 2015/0148786 A1 | 5/2015 | Plunkett | |

FOREIGN PATENT DOCUMENTS

| | | |
|---|---|---|
| DE | 102012107437 | 6/2014 |
| DE | 102013211868 | 12/2014 |
| EP | 2161494 | 3/2010 |
| EP | 2778512 | 9/2014 |
| EP | 2886937 | 6/2015 |
| FR | 2934353 | 1/2018 |
| JP | 2014229510 | 12/2014 |
| WO | WO2003009012 | 5/2003 |
| WO | WO2010134069 | 11/2010 |
| WO | WO2012059852 | 5/2012 |
| WO | WO2015113979 | 8/2015 |

OTHER PUBLICATIONS

International Application No. PCT/US2015/061268, Notification of Transmittal of the International Search Report and the Written Opinion of the International Searching Authority, dated Feb. 11, 2016, 10 pages.

International Application No. PCT/US2017/029475, Notification of Transmittal of the International Search Report and the Written Opinion of the International Searching Authority, dated Jul. 18, 2017, 15 pages.

* cited by examiner

Key:
|→> rays of 145 that have a component parallel to y-axis; and
|←> rays of 145 that have a component antiparallel to y-axis.

WALL WASH LUMINAIRE WITH LIGHT GUIDE AND OPTICAL ELEMENT THEREFORE

CROSS-REFERENCE TO RELATED APPLICATIONS

This application is a continuation application of and claims priority to U.S. application Ser. No. 15/162,319, filed May 23, 2016, which is a continuation application of and claims priority to U.S. application Ser. No. 14/692,550, filed Apr. 21, 2015, which claims benefit under 35 U.S.C. § 119(e)(1) of U.S. Provisional Application No. 62/081,482, filed on Nov. 18, 2014, incorporated herein by reference.

TECHNICAL FIELD

The present disclosure relates generally to luminaires for illuminating proximate target surfaces typically in a slightly grazing to grazing configuration, for example to wall wash or grazer luminaires including solid state-based light guide illumination devices.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to wall wash luminaires that include a solid state-based light guide illumination device.

In general, innovative aspects of the technologies described herein can be implemented in an illumination device that includes one or more of the following aspects:

In a first aspect, a light shaping optical article includes a solid optic having a cross-sectional profile including an input interface; a convex output surface opposite the input interface; a concave first side surface extending between the input interface and the convex output surface; and a second side surface opposite the concave first side surface extending from between input interface to the convex output surface. Here, the concave first side surface and the convex output surface are shaped and arranged such that, when the solid optic receives input light at the input interface having an input angular range in a plane of the cross-sectional profile the solid optic guides the light to and emits the light from the output surface in an output angular range in the plane, where a prevalent propagation direction of output light in the output angular range is tilted toward the second side surface relative to a prevalent propagation direction of input light in the input angular range. Additionally, the solid optic has an elongate extension extending from the plane of the cross-sectional profile.

The foregoing and other embodiments can each optionally include one or more of the following features, alone or in combination. In some implementations, the elongate extension of the solid optic can be perpendicular to the plane of the cross-sectional profile.

In some implementations, the second side surface can be planar. In some implementations, the solid optic is configured so that a divergence of output light in the output angular range can be smaller than a divergence of input light in the input angular range. In some implementations, the solid optic is configured so that a relative tilt angle α between the prevalent propagation direction of output light in the output angular range and the prevalent propagation direction of input light in the input angular range can be in a tilt range of 3° to 30°. For example, the tilt range is 10° to 20°.

In some implementations, the concave first side surface and the second side surface are shaped and arranged relative to each other such that, for a given divergence of the input angular range, the input light received by the solid optic can reach the convex output surface either directly or via a single reflection off the concave first side surface or the second side surface. In some implementations, the convex output surface can include a diffusion pattern. In some implementations, the disclosed light shaping optical, further can included a diffusive film attached to the convex output surface.

In some implementations, the solid optic can include plastic material. In some implementations, a separation between the concave first side surface and the second side surface at the input interface can be less than 20 mm. For example, the separation is less than 10 mm. In some implementations, a separation between the input interface and the convex output surface can be less than 50 mm. For example, the separation between the input interface and the convex output surface is less than 25 mm.

In a second aspect, a luminaire module includes a plurality of LEEs distributed along a transverse direction; a light guide including opposing first and second ends and a pair of opposing lateral surfaces elongated along the transverse direction and extending in a forward direction orthogonal to the transverse direction, from the first end to the second end, the light guide configured to receive at the first end light from the LEEs and guide the received light in the forward direction to the second end; and the light shaping optical article of the first aspect coupled with the second end of the light guide at the input interface to receive the guided light as the input light in the input angular range. Here, the forward direction of the light guide corresponds to the prevalent propagation direction of input light in the input angular range.

The foregoing and other embodiments can each optionally include one or more of the following features, alone or in combination. In some implementations, the disclosed luminaire module can included one or more optical couplers configured to collimate light emitted by the LEEs and to provide the collimated light to the first end of the light guide. In some implementations, the LEEs can be LEDs that provide white light. In some implementations, the lateral surfaces of the light guide can be planar and parallel. In some implementations, a separation between the lateral surfaces of the light guide at the second end can match an input separation between the concave first side surface and the second side surface at the input interface of the light shaping optical article. In some implementations, an extent of both the light guide and of the input interface of the light shaping optical article along the transverse direction can be in a range of 10 cm and 1m. For example, the extent of the light guide between the first and second ends is in a range of 10-50 mm.

In a third aspect, an illumination device includes the luminaire module of the second aspect and a hinging element. Here, the hinging element includes (i) a first hinging portion coupled with the luminaire module, (ii) a second hinging portion pivotally connected to the first hinging portion and configured to form a pivot parallel to the transverse direction, and (iii) the pivot configured to allow tilting the light guide relative to the second hinging portion by an additional tilt angle $\theta$ in an angular direction, such that the prevalent propagation direction of output light in the output angular range is tiltable relative to the second hinging portion by a sum of the tilt angle and the additional tilt angle, $\alpha+\theta$.

The foregoing and other embodiments can each optionally include one or more of the following features, alone or in combination. In some implementations, the disclosed illumination device can include a rail elongated along the transverse direction and attached to the light guide to support the luminaire module. Here, the first hinging portion is connected to the rail, and the second hinging portion includes a plate. In some implementations, the hinging element can be elongated along the transverse direction. In some implementations, the pivot is configured to allow continuous or discrete variations of the additional tilt angle.

In a fourth aspect, an illumination device includes the luminaire module of the second aspect and an adjustable orientation reflector. Here, the adjustable orientation reflector includes (i) a reflector support coupled with the luminaire module, (ii) a reflector element pivotally connected to the reflector support and configured to form a reflector pivot parallel to the transverse direction, wherein the reflector pivot is adjacent an intersection between the concave first surface and the convex output surface of the light shaping optical article. The reflector pivot is configured to allow swinging the reflector element into paths of at least some of the output light and to allow tilting the reflector element relative to the light guide by a reflector tilt angle $\varphi/2$ in the same angular direction as the tilt angle $\alpha$ between the prevalent propagation direction of output light in the output angular range and the prevalent propagation direction of input light in the input angular range, such that the prevalent propagation direction of the output light that reflects off the reflector is tilted relative to the prevalent propagation direction of input light in the input angular range by a sum of the tilt angle and the reflector tilt angle, $\alpha+\varphi$.

In a fifth aspect, an illumination system includes at least one illumination device of the third aspect and a mount to which the second hinging portion of the illumination device is connected to support the luminaire module of the illumination device inside a recession of a ceiling adjacent a wall. Here, the mount is parallel to the wall.

The foregoing and other embodiments can each optionally include one or more of the following features, alone or in combination. In some implementations, the disclosed illumination system can include a single illumination device. In other implementations, the disclosed illumination system can include multiple illumination devices distributed on a path along their transverse directions and separated from each other by a predetermined separation. For example, the predetermined separation is less than a transverse dimension of each illumination device.

In some implementations, the disclosed illumination system can include an adjustable orientation reflector. Here, the adjustable orientation reflector includes a reflector support coupled with the luminaire module, and a reflector element pivotally connected to the reflector support and configured to form a reflector pivot parallel to the transverse direction. The reflector pivot is adjacent an intersection between the concave first surface and the convex output surface of the light shaping optical article, and the reflector pivot is configured to allow swinging the reflector element into paths of at least some of the output light and to allow tilting the reflector element relative to the light guide by a reflector tilt angle $\varphi/2$ in the same angular direction as the tilt angle $\alpha$ between the prevalent propagation direction of output light in the output angular range and the prevalent propagation direction of input light in the input angular range, such that the prevalent propagation direction of the output light that reflects off the reflector is tilted relative to the second hinging portion by a sum of the tilt angle, the additional tilt angle and the reflector tilt angle, $\alpha+\theta+\varphi$.

In some implementations of the illumination device of the fourth aspect or in some implementations of the disclosed illumination system, the reflector element can have a dimension orthogonal to the transverse direction in a range of 5-10 cm. In some implementations of the illumination device of the fourth aspect or of the disclosed illumination system, the reflector element can be a flat plate. In some implementations of the illumination device of the fourth aspect or in some implementations of the disclosed illumination system, the reflector element can be coated with reflective material. In some implementations of the illumination device of the fourth aspect or in some implementations of the disclosed illumination system, the reflector pivot can include actuators to adjust the reflector tilt.

In some implementations of the disclosed illumination system, the mount can include actuators to adjustably position the convex output surface of the light shaping optical article relative to a level of the ceiling. In this case, a portion of the reflector element can protrude from the recession below the ceiling level.

The details of one or more implementations of the technologies described herein are set forth in the accompanying drawings and the description below. Other features, aspects, and advantages of the disclosed technologies will become apparent from the description, the drawings, and the claims.

Figure 1A:
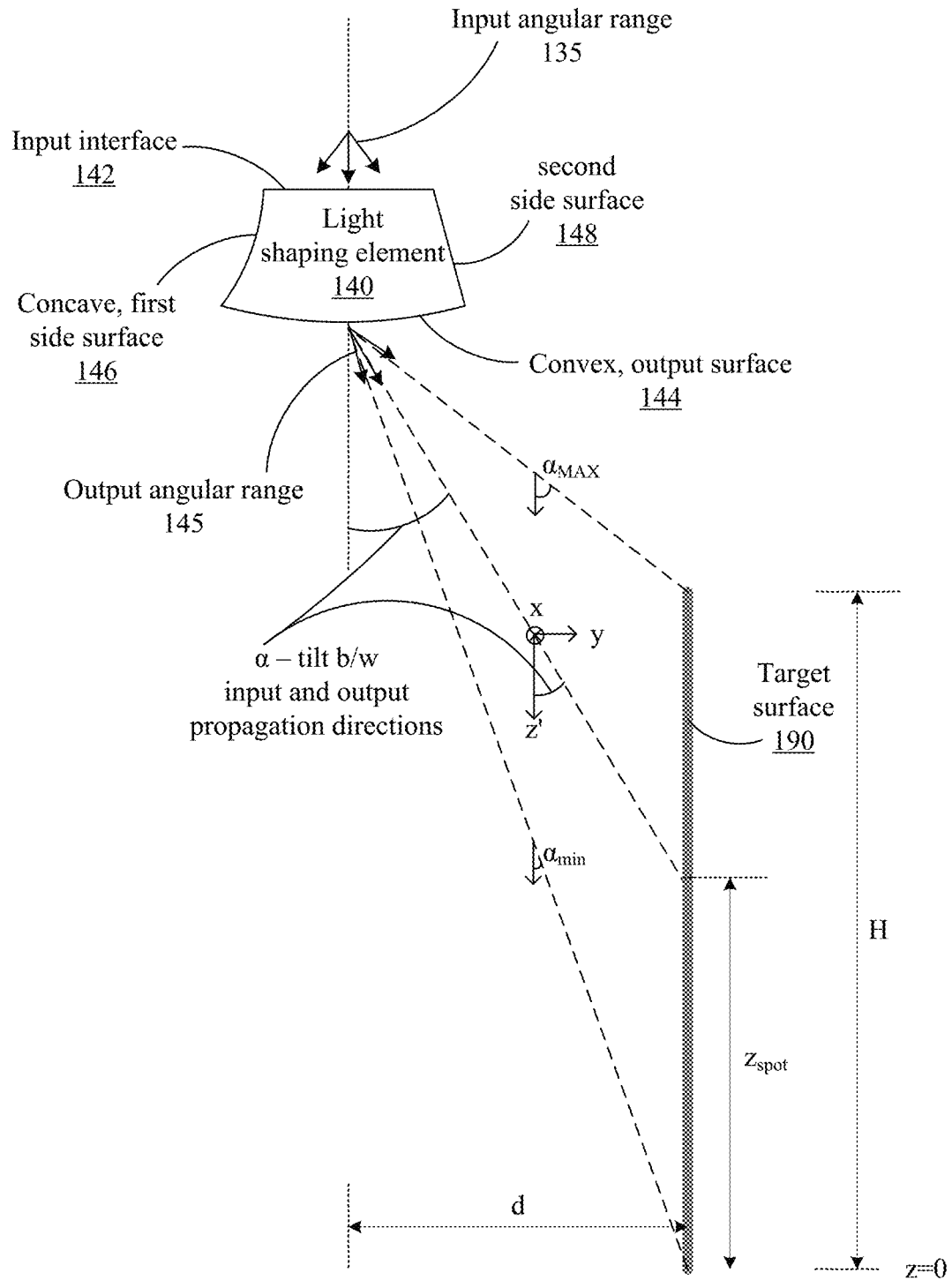
FIGS. 1A-1D show aspects of an example of a light shaping optical article to be used as part of a wall wash luminaire.

Reference numbers and designations in the various drawings indicate exemplary aspects, implementations of particular features of the present disclosure.

DETAILED DESCRIPTION

The present disclosure relates to luminaires for providing wall wash illumination. The disclosed luminaires can efficiently guide and distribute light emitted by solid-state light sources towards target surfaces, e.g., towards walls, panels or other target surfaces, to uniformly illuminate the target surfaces. Target surfaces can have vertical, horizontal or other arrangements. With respect to illumination the term uniformity is intended to refer to constraining the maximum-to-minimum ratio (MMR) of the illuminance caused by the luminaire on the target surface. For example, the MMR may be constrained to be lower than 4:1, 3:1 or 2:1.

A light shaping optical article is disclosed that is configured to provide light in an output angular range that is tilted relative to a prevalent direction of propagation of light in an input angular range and distributed to illuminate a defined target surface within a predetermined MMR. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the (angular) intensity distribution. (See, e.g., FIG. 1C or 3C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

The disclosed light shaping optical article can be used in a light guide luminaire module (also referred to simply as a luminaire module), such that light in the input angular range is emitted by solid-state light sources and guided by a light guide of the light guide luminaire module to an input aperture of the light shaping optical article. In some cases, a propagation direction of the light output by the light shaping optical article can be further tilted by incorporating the light guide luminaire module in an illumination device that uses a hinging element configured to tilt the light guide of the light guide luminaire module relative to the target surface. Alternatively, the propagation direction tilt of the output light can be increased by incorporating the light guide luminaire module in another illumination device that uses a reflector arranged to deflect the light output by the light shaping optical article relative to the target surface. An illumination system that includes either of the foregoing illumination devices, or a combination thereof, can be recessed in a ceiling at a desired distance from the target wall to operate as a wall wash.

(i) Light Shaping Optical Article

FIG. 1A illustrates a block diagram of a light shaping optical article 140 configured to tilt, by a tilt angle α≠0, a prevalent propagation direction of light in an output angular range 145 relative to a prevalent propagation direction of light in an input angular range 135. Here, a reference system (x,y,z) has a z-axis aligned to the prevalent propagation direction of light in input angular range 135. In the example shown in FIG. 1A, a target surface 190 also is aligned parallel to the z-axis. However, the prevalent propagation direction of light in input angular range 135 can, but does not have to, be parallel to the target surface 190.

The light shaping optical article 140 is formed from a solid, transparent material (with n>1). For example, the solid, transparent material can be glass with a refractive index of about 1.5. As another example, the solid, transparent material can be plastic with a refractive index of about 1.5-1.6.

The light shaping optical article 140 includes an input surface 142 through which input light with the input angular range 135 enters into the light shaping optical article 140, and an output surface 144 through which output light with the output angular range 145 exits from the light shaping optical article 140. Further, the light shaping optical article 140 has a first side surface 146 and a second side surface 148. The first side surface 146 is concave and the output surface 144 is convex. The second side surface 148 of the light shaping optical article 140 can have negative, zero or positive curvature. Additionally, the concave first side surface 146 and convex output surface 144 are configured such that the prevalent propagation direction of light in output angular range 145 is tilted by the tilt angle α toward the second side surface 148 relative to prevalent propagation direction of light in the input angular range 135. In this manner, α is a tilt of the prevalent propagation direction of output angular range 145 relative to the z-axis.

Figure 1B:
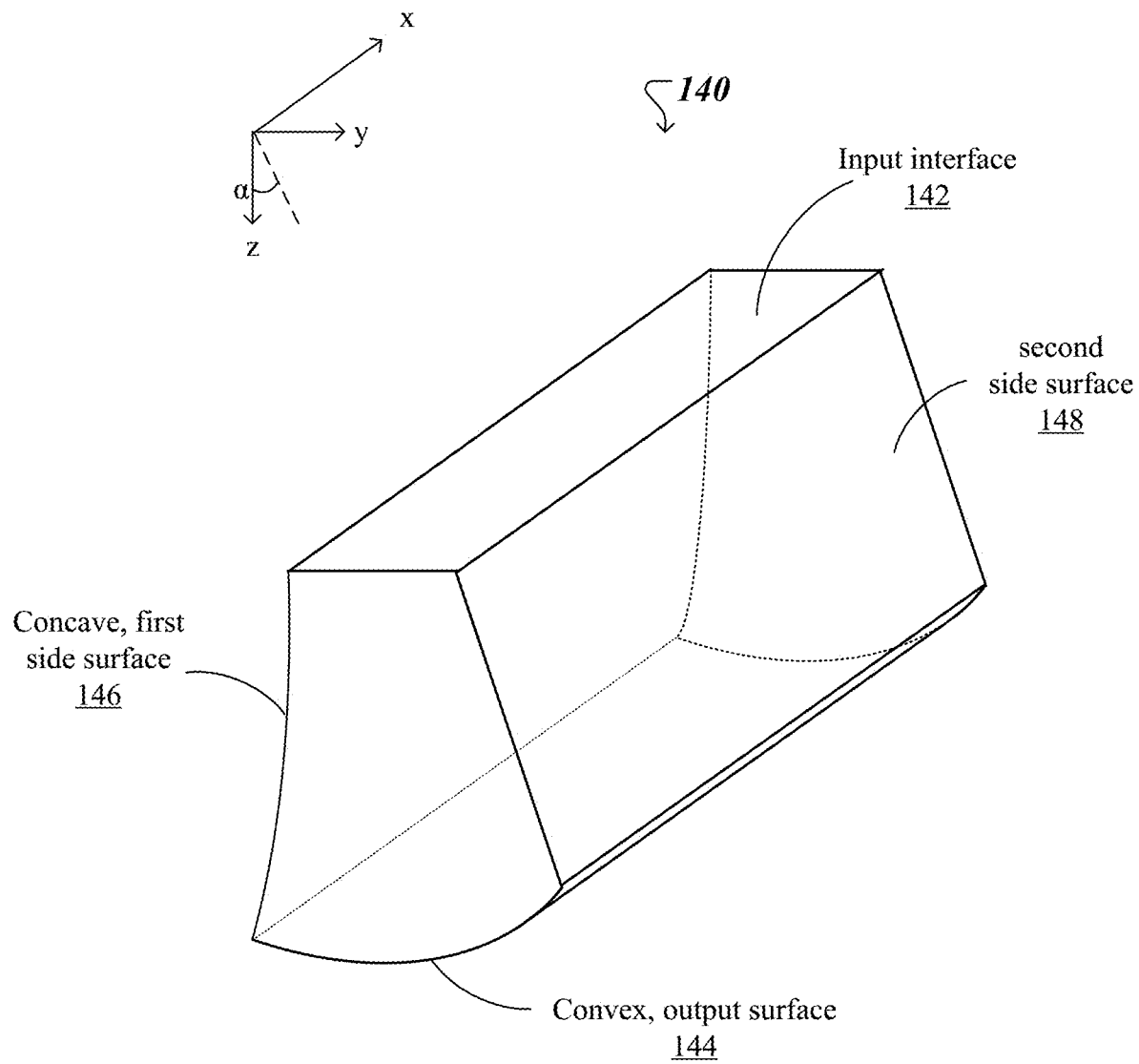

FIG. 1B shows that the light shaping optical article 140 is elongated along the x-axis. In this manner, input angular range 135 and output angular range 145 can be the same in the (z-x) plane while ignoring refraction at the output surface. An input interface corresponding to the input surface 142 represents an extended light source. In implementations in which the input surface 142 of the light shaping optical article 140 is coupled to an output end of a light guide (as it is in the case illustrated in FIG. 3A), a prevalent propagation direction of the input angular range 135 can be parallel to the light guide.

A divergence of the input angular range 135 in a (y-z) plane (a plane perpendicular to the x-axis) can be that of a Lambertian or narrower distribution, for example. As another example, a distribution of light within the input angular range 135 in the (y-z) plane can also have more than one peak. For solid light guides, the divergence of the input angular range is typically narrow enough to allow all light to be guided within the light guide via total internal reflection (TIR). Depending on the implementation, a lateral distribution of light within the input angular range 135 in the (x-z) plane (e.g., parallel to the x-axis) can be shaped similarly to the distribution of light within the input angular range 135 in the (y-z) plane. In some implementations, such a lateral distribution can have a bat-wing profile with multiple lobes, for example. Divergence in the (x-z) plane of the output angular range 145 is determined by the divergence of the input angular range 135, and may be affected by the refractive indices at and the curvatures and arrangements of surfaces 144, 146 and 148, for example.

Figure 1C:
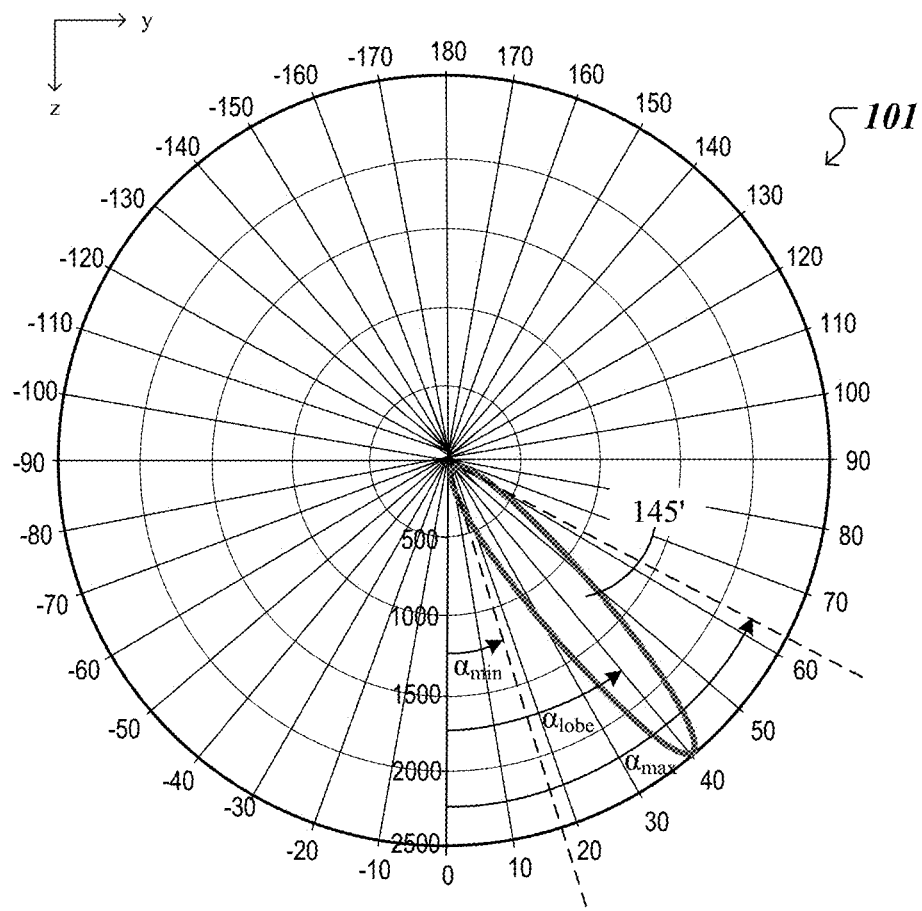

FIG. 1C shows a light intensity distribution 101 of the light output by the light shaping optical article 140 in the (y-z) plane. Here, the z-axis is aligned along the prevalent propagation direction of light in the input angular range 135.

A lobe 145' of the light intensity distribution 101 represents the light output by the light shaping optical article 140 in the output angular range 145. A bisector of the lobe 145' corresponds to the prevalent propagation direction of light of the output angular range 145. Here, the bisector of the lobe 145' is tilted by a tilt angle $\alpha=\alpha_{lobe}$ relative to the z-axis, and a value of $\alpha_{lobe}$ is about 40°. In other implementations, the value of $\alpha_{lobe}$ can be different, for example about 5, 10, 30 or 50°. A width at half-max of the lobe 145' corresponds to the divergence of light of the output angular range 145. Here, the width at half-max of the lobe 145' has a value of about 20°. In other implementations, the value of the width at half-max of the lobe 145' can be about 5, 10 or 30°. Angles $\alpha_{min}$ and $\alpha_{max}$ define an angular interval outside of which the light intensity drops to less than 5% from the peak intensity value of the lobe 145'.

Once the tilt $\alpha$, divergence (e.g., the width of lobe 145' of the light intensity distribution 101) of output angular range 145 and the corresponding intensity distribution are specified through design of the light shaping optical article 140, a distance "d"—from an "effective center" of the convex output surface 144 of the light shaping optical article 140 to the target surface 190 of height H—can be varied to control uniformity of the illuminance on the target surface. As noted, this can be defined for example as $I_{MAX}/I_{min}$ below a maximum value N: $1 < I_{MAX}/I_{min} < N$, over the entire height H of target surface 190.

Depending on the embodiment, parameters d, $\alpha$ and the divergence of the output angular range 145 may determine a height, denoted $z_{spot}$, on the target surface 190 above ground (z=0) where the prevalent direction of propagation (denoted in dashed-line) of the output angular range 145 intersects the target surface 190, for example. As shown in the analyses illustrated in FIGS. 7-14, the intersection point at $z_{spot}$ can correspond to maximum intensity $I_{MAX}$ of the output light on the target surface 190, and intersections of outer rays of the output angular range 145—tilted respectively at $\alpha_{min}$ and $\alpha_{MAX}$ relative to the z-axis—can correspond to minimum intensity $I_{min}$ of the output light on the target surface 190.

It is noted that, in general, to control divergence and prevalent propagation direction of the output angular range 145, the shape of the concave first side surface 146 is such that a small element of the noted surface accepts incoming rays from within a narrow angular range only (to allow that surface element to be exposed to fewer impinging rays and thereby have more control to redirect the impinging rays). This can require large lengths of the noted surface (in forward direction, e.g., along z-axis) or, shallow incidence angles (corresponding to a small divergence of the input angular range 135.) As such, light impinging on the concave first side surface 146 reaches the convex output surface 144 directly rather than being redirected first to the second side surface 148. Also, the second side surface 148 is shaped and arranged to receive relatively little light from the extended source corresponding to the input interface formed by input surface 142. For these reasons, the second side surface 148 plays a limited role in controlling divergence and prevalent propagation direction of the output angular range 145 and the corresponding intensity distribution.

In this manner, the divergence and propagation direction of light in the output angular range 145 can be determined largely by a combination of (i) an optical power of the concave first side surface 146, (ii) an optical power of the convex output surface 144 and (iii) relative arrangements between the convex output surface 144 and each of the z-axis and the concave first side surface 146. The specific shapes of the respective surfaces can influence the intensity distribution and thereby affect the degree of uniformity of the illuminance on the target surface.

Figure 1D:
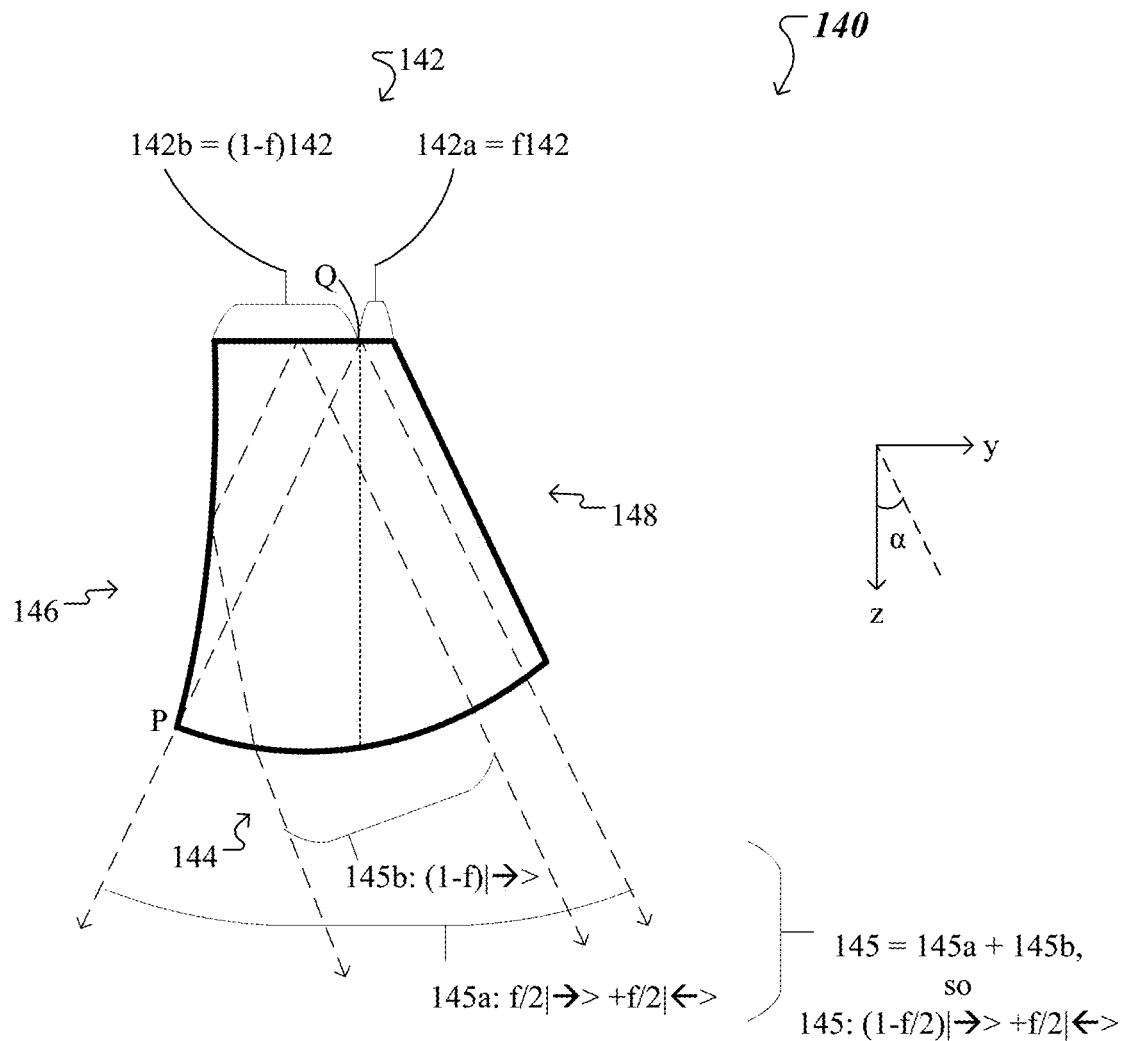

FIG. 1D shows a ray-diagram for an example implementation of light shaping optical article 140 to illustrate the noted design considerations. In this example, light propagates from the input surface 142 with a narrow input angular range 135 and a prevalent propagation direction along the z-axis. Rays from the input surface 142 are represented in long-dashed lines. The divergence of the input angular range 135 is indicated using rays emanating from points of input surface 142.

In this example, the concave first side surface 146, the convex output surface 144 and the second side surface 148 are shaped and arranged in the following manner. The concave first side surface 146 intersects the convex output surface 144 at point P. In some implementations, a leftmost ray from among rays emanating from an intersection point Q of the dotted normal line with the input surface 142 is tangent to the concave first side surface 146 at the point P; and the second side surface 148 is planar and substantially parallel to rightmost rays emanating from the input surface 142. Here, the point Q defines a first portion 142a of the input surface 142 that is a fraction f of the input surface 142, and a remaining, second portion 142b of the input surface 142 that is a fraction (1-f) of the input surface 142. For instance, f=10%, 20%, etc. In this manner, points of the first portion 142a contribute rays that are output by the light shaping optical article 140 in a first output angular range portion 145a. Here, f/2 of rays contributed by the first portion 142a have a positive y-component (denoted $|\rightarrow>$) and f/2 of rays contributed by the first portion 142a have a negative y-component (denoted $\leftarrow>$) before they reach the output surface 144. The ratio of rays of the corresponding refracted light after transmission can be different depending on the shape and arrangement of the output surface 144. Note that the f/2 rays contributed by the first portion 142a with components $\leftarrow>$ antiparallel to the y-axis exit through the convex output surface 144 without reflections from the concave first side surface 146.

Moreover, points of the second portion 142b contribute rays that are output by the light shaping optical article 140 in a second output angular range portion 145b. Here, (1-f)/2 of rays contributed by the second portion 142b have a positive y-component $|\rightarrow>$ and (1-f)/2 of rays contributed by the second portion 142b have a negative y-component $\leftarrow>$ and are pointing to the concave first side surface 146. Note that most of the (1-f)/2 rays contributed by second portion 142b with negative y-components $\leftarrow>$ reflect off the concave first side surface 146, such that the reflected rays have a positive y-component $|\rightarrow>$. Moreover, the reflected rays with positive y-components $|\rightarrow>$ directly reach the convex output surface 144 without reflections from the second side surface 148. In this manner, upon exiting the convex output surface 144, components orthogonal to the forward direction (the z axis) of most of the rays contributed by the second portion 142b are parallel to the y-axis. As such, the output angular range 145, which is a sum of the first output angular range portion 145a and the second output angular range portion 145b, 145=145a+145b, has more rays with a positive y-axis component $|\rightarrow>$, about (1-f)/2, than rays with a negative y-axis component $\leftarrow>$, about f/2. In this manner, a prevalent direction of propagation of light in the output angular range 145 has a positive y-axis component $|\rightarrow>$.

An example implementation of the light shaping optical article 140 disclosed above is described next.

Example of a Light Shaping Optical Article

Figure 2A:
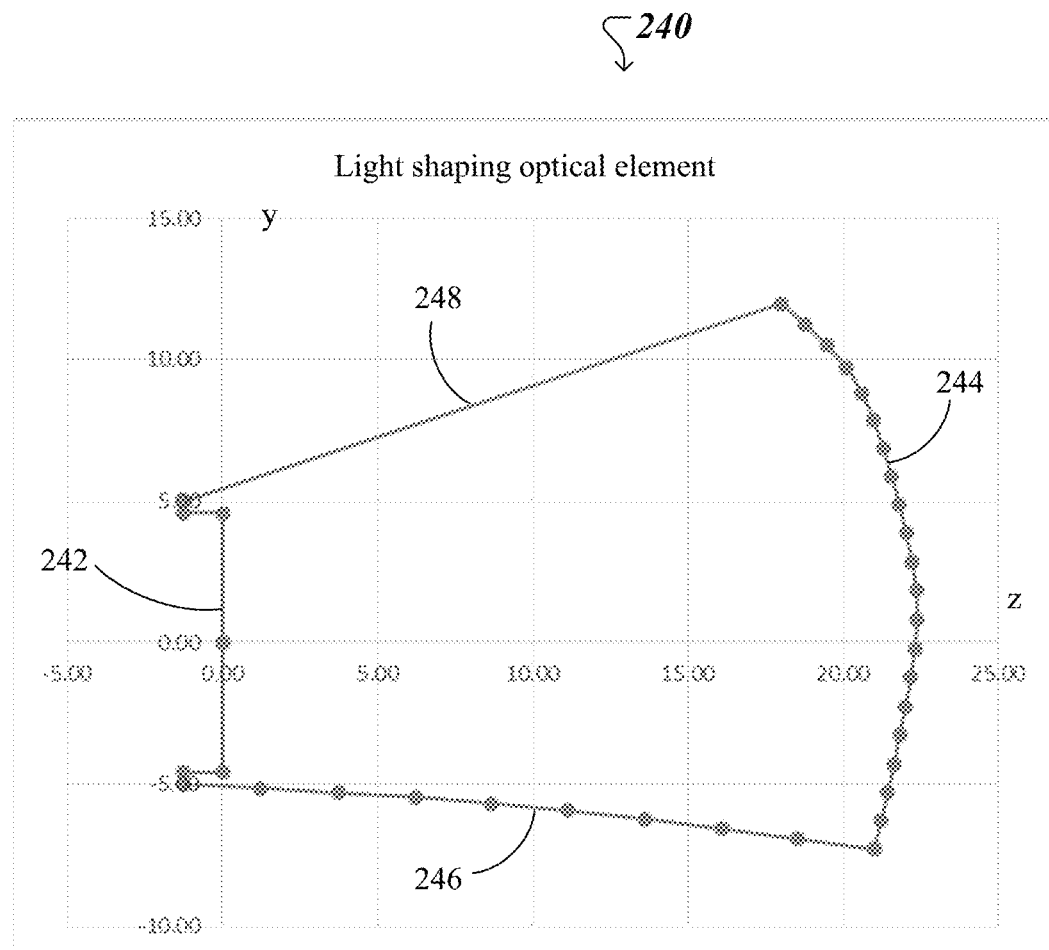
FIGS. 2A-2F show structural aspects of an example of a light shaping optical article.

FIG. 2A is a cross-section in the (y-z) plane of an example of a light shaping optical article 240. The light shaping optical article 240 is formed from a solid material (with refractive index n>1). For example, the material can be glass with a refractive index of about 1.5. As another example, the material can be plastic with a refractive index of about 1.5-1.6. The light shaping optical article 240 includes an input surface 242, an output surface 244, a first side surface 246 and a second side surface 248.

Figure 2B:
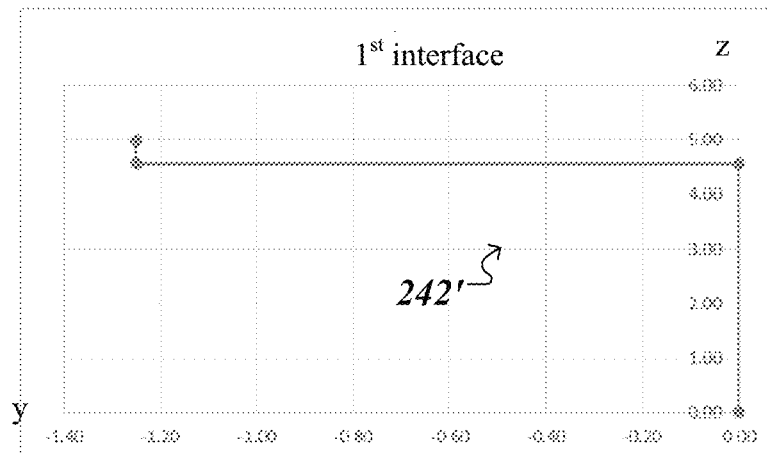

The input surface 242 is formed from a first interface 242' (also referred to as the $1^{st}$ interface), which is represented above the z-axis in this example, and a second interface 242" (also referred to as the $2^{nd}$ interface), which is represented below the z-axis in this example. FIG. 2B is a cross-section in the (y-z) plane of the $1^{st}$ interface 242'—the z and y axes have different scaling. Coordinates of a polyline corresponding to the $1^{st}$ interface 242' are given in Table 1.

TABLE 1

| $1^{st}$ interface 242' | | |
|---|---|---|
| Point | z (mm) | y (mm) |
| 1 | 0 | 0 |
| 2 | 0 | 4.57 |
| 3 | −1.25 | 4.57 |
| 4 | −1.25 | 5 |

Figure 2C:
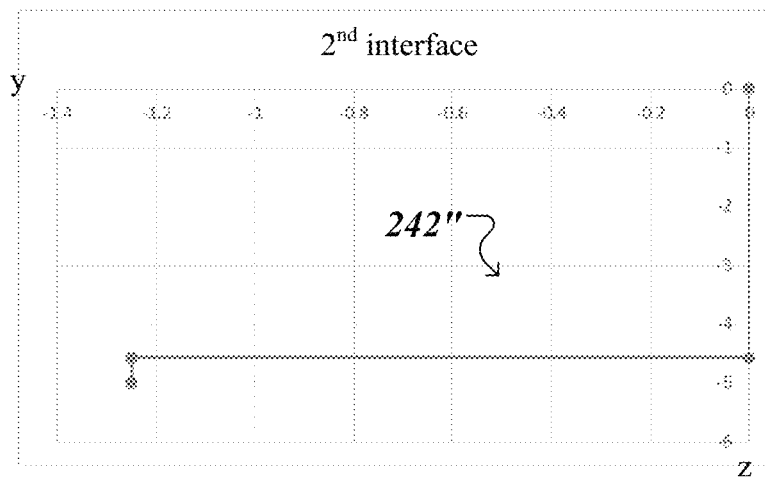

FIG. 2C is a cross-section in the (y-z) plane of the $2^{nd}$ interface 242"—again, the z and y axes have different scaling. Coordinates of a polyline corresponding to the $2^{nd}$ interface 242" are given in Table 2.

TABLE 2

| $2^{nd}$ interface 242" | | |
|---|---|---|
| Point | z (mm) | y (mm) |
| 1 | −1.25 | −5 |
| 2 | −1.25 | −4.57 |
| 3 | 0 | −4.57 |
| 4 | 0 | 0 |

The input surface 242 of the light shaping optical article 240 can be bonded to an output end of a light guide as described below in connection with FIG. 3B, for instance. In such case, an anti-reflective coating may be disposed between the output end of the light guide and light shaping optical article 240. If the material of the light shaping optical article 240 is different from the material from which the light guide is formed, for example an index matching layer may be disposed between the output end of the light guide and light shaping optical article 240. In other cases, the light guide and the light shaping optical article 240 can be integrally formed.

Figure 2D:
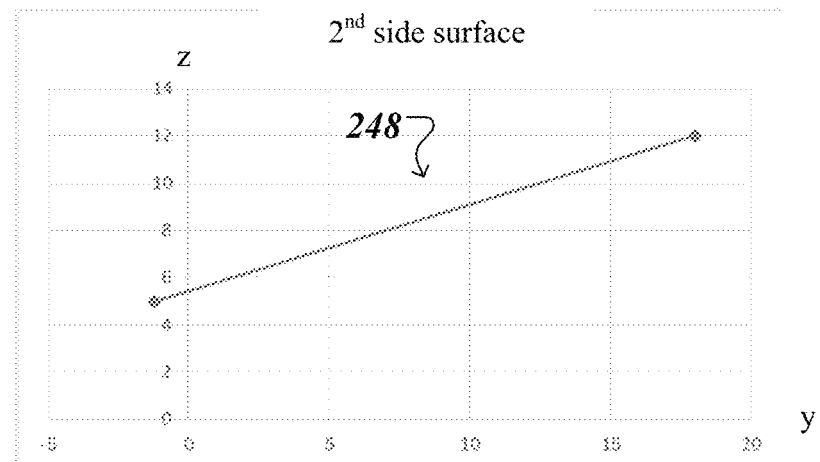

FIG. 2D is a cross-section in the (y-z) plane of the second side surface 248. Coordinates of the section of the second side surface 248 are given in Table 3—the section is a straight line.

TABLE 3

| $2^{nd}$ side surface 248 | | |
|---|---|---|
| Point | z (mm) | y (mm) |
| 1 | −1.25 | 5 |
| 2 | 18 | 12 |

Here, the second side surface 248 of the light shaping optical article 240 is planar and plays a minor role in determining a tilt angle α relative the z-axis of the propagation direction of light in the output angular range 145 or a divergence of the output angular range 145. In some implementations, the second side surface 248 is uncoated. In such cases, light from the input surface 242 that impinges on the second side surface 248 at angles beyond a critical angle $\theta = \arcsin(1/n)$ relative to the respective surface normal reflects off the second side surface 248 via total internal reflection (TIR). In other implementations, the second side surface 248 is coated with a reflective coating. In such cases, light from the input surface 242 that reaches the second side surface 248 reflects off the second side surface 248 via specular reflection or diffuse reflection or a combination thereof.

Figure 2E:
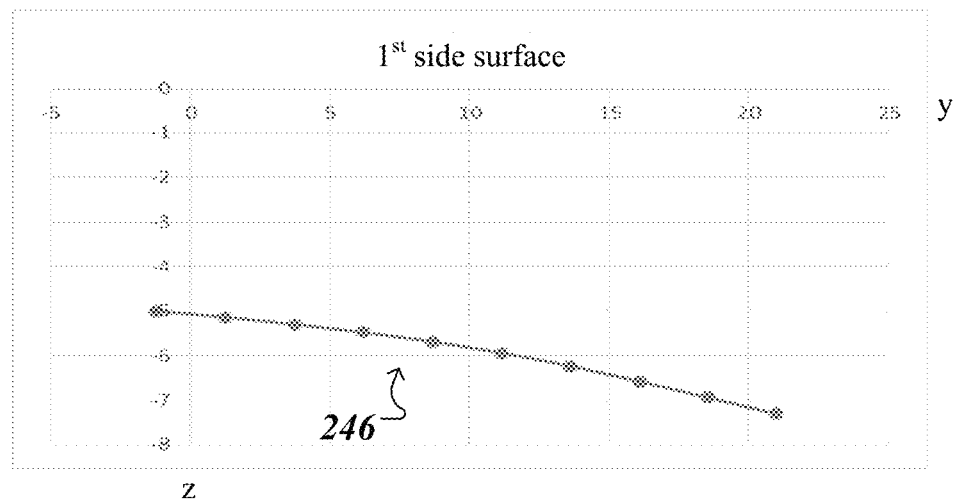

FIG. 2E is a cross-section in the (y-z) plane of the first side surface 246. Coordinates of nodes for a fitted curve, e.g., a spline, corresponding to the first side surface 246 are given in Table 4.

TABLE 4

| $1^{st}$ side surface 246 | | |
|---|---|---|
| Point | z (mm) | y (mm) |
| 1 | 21 | −7.3 |
| 2 | 18.54 | −6.93 |
| 3 | 16.08 | −6.57 |
| 4 | 13.61 | −6.24 |
| 5 | 11.15 | −5.94 |
| 6 | 8.67 | −5.68 |
| 7 | 6.2 | −5.47 |
| 8 | 3.72 | −5.3 |
| 9 | 1.23 | −5.14 |
| 10 | −1.25 | −5 |

Here, the first side surface 246 of the light shaping optical article 240 is concave and, along with the output surface 244, plays a major role in determining the tilt angle α relative to the z-axis of the propagation direction of light in the output angular range 145 and the divergence of the output angular range 145. In some implementations, the concave first side surface 246 is uncoated. In such cases, light from the input surface 242 that impinges on the concave first side surface 246 at angles beyond the critical angle $\theta = \arcsin(1/n)$ reflects off the concave first side surface 246 via total internal reflection (TIR). In other implementations, the concave first side surface 246 is coated with a reflective coating. In such cases, light from the input surface 242 that reaches the concave first side surface 246 reflects off the concave first side surface 246 via specular reflection or diffuse reflection or a combination thereof.

Figure 2F:
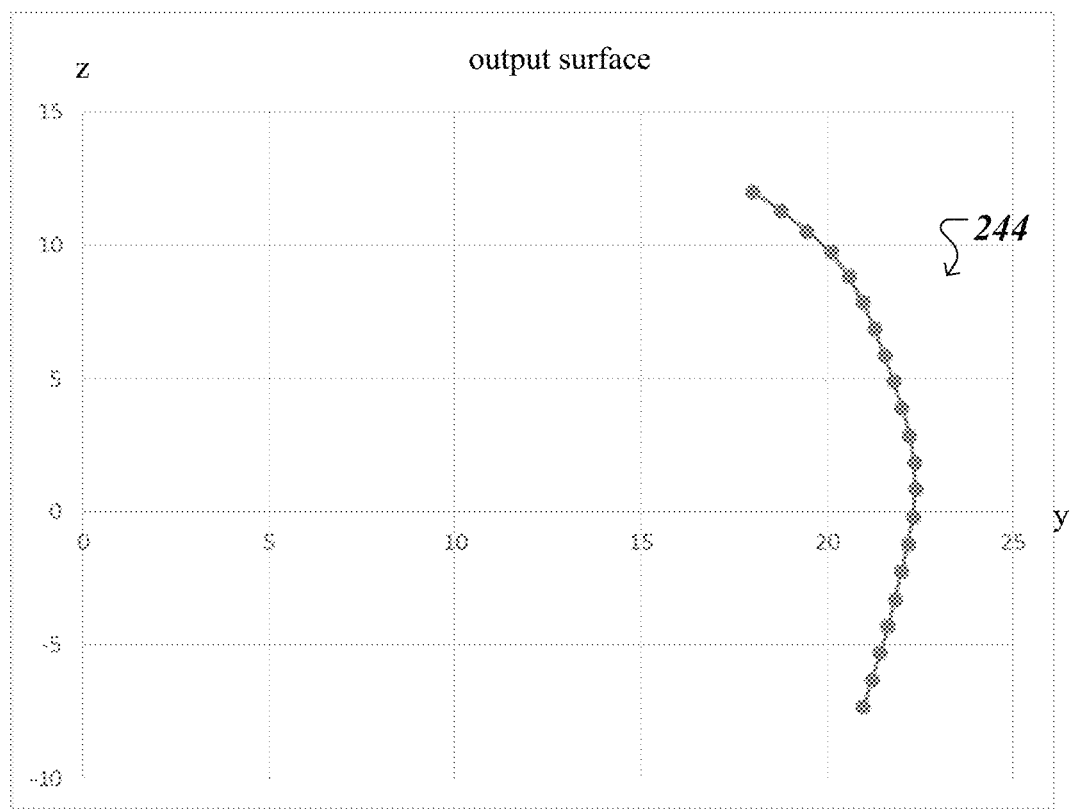

FIG. 2F is a cross-section in the (y-z) plane of the output surface 244. Coordinates of nodes for a fitted curve, e.g., a spline, corresponding to the output surface 244 are given in Table 5.

TABLE 5 output surface 244

| Point | z (mm) | y (mm) |
|---|---|---|
| 1 | 18 | 12 |
| 2 | 18.76 | 11.28 |
| 3 | 19.48 | 10.53 |
| 4 | 20.1 | 9.72 |
| 5 | 20.6 | 8.83 |
| 6 | 20.98 | 7.87 |
| 7 | 21.28 | 6.88 |
| 8 | 21.56 | 5.88 |
| 9 | 21.81 | 4.89 |
| 10 | 22.03 | 3.88 |
| 11 | 22.23 | 2.87 |
| 12 | 22.36 | 1.84 |
| 13 | 22.4 | 0.82 |
| 14 | 22.32 | −0.21 |
| 15 | 22.18 | −1.23 |
| 16 | 22.01 | −2.25 |
| 17 | 21.83 | −3.27 |
| 18 | 21.64 | −4.28 |
| 19 | 21.44 | −5.29 |
| 20 | 21.22 | −6.29 |
| 21 | 21.00 | −7.3 |

Here, the output surface 244 of the light shaping optical article 240 is convex and, along with the concave first side surface 246, plays a major role in determining the tilt angle α relative the z-axis of the propagation direction of light in the output angular range 145 and the divergence of the output angular range 145. In some implementations, the convex output surface 244 is uncoated. In other implementations, an anti-reflective coating may be provided on the convex output surface 244 such that light that reaches the convex output surface 244—directly from the input surface 242 or after reflection off the concave first side surface 246 or the second side surface 248—can transmit with minimal back reflection. In other implementations, the convex output surface 244 is coated with a diffusive coating (e.g., Bright-View M PR05 TM). In such cases, light from the input surface 242 that reaches the concave first side surface 246 that reaches the convex output surface 244—directly from the input surface 242 or after reflection off the concave first side surface 246 or the second side surface 248—can diffuse upon transmission through the convex output surface 244.

The light shaping optical article 140 or 240 can be used in a light guide luminaire module, as described below in connection with FIG. 3A or 5A, such that light in the input angular range 135 is provided by solid-state light sources and guided by a light guide of the light guide luminaire module to the input surface 142 or 242 of the light shaping optical article 140 or 240, respectively. In some cases, when a prevalent propagation direction (e.g., given in terms of the tilt angle α) of the light output by the light shaping optical article 140 or 240 is insufficiently tilted for uniformly illuminating a target surface 190, e.g., a certain portion of a wall, the prevalent propagation direction tilt of the output light can be further increased by incorporating the light guide luminaire module in various illumination devices as described below.

Figure 3A:
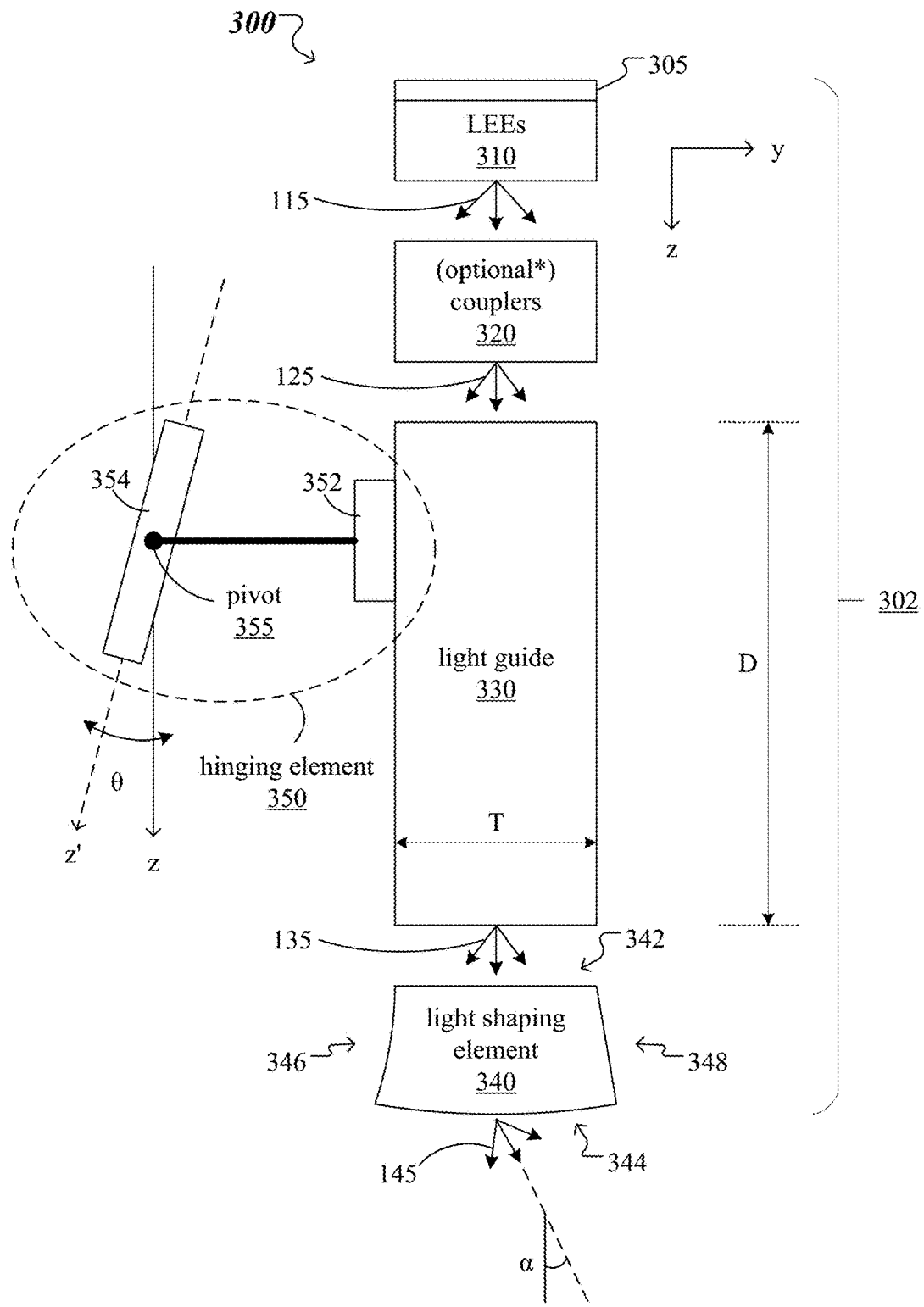
FIGS. 3A-3C show aspects of an example of an illumination device based on a light guide luminaire module that includes a light shaping optical article.

(ii) Illumination Device Based on Light Guide Luminaire Module with Light Shaping Optical Article FIG. 3A is a block diagram of an example of an illumination device 300 based on a light guide luminaire module 302 that includes a light shaping optical article 340. The light shaping optical article 340 can be implemented as a light shaping optical article 140 or 240 described in connection with FIG. 1A or 2A, for example.

The light guide luminaire module 302 further includes a substrate 305, one or more light emitting elements (LEEs) 310 and a light guide 330. The light guide 330 guides the light provided by the LEEs 310 along a length D (e.g., along the z-axis of the Cartesian reference system shown in FIG. 3A.) Optionally, the light guide luminaire module 302 further includes one or more optical couplers 320, such that the light guide 330 is coupled at its input end to the LEEs via the optical coupler(s) 320 and at its output end to the light shaping optical article 340.

The illumination device 300 includes a pivoting system comprising a hinging element 350, for example. The hinging element 350 is configured to allow tilting the light guide 330 of the light guide luminaire module 302 by an inclination angle θ≠0 relative to the axis z.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 310 provide light within a first angular range 115. Such light can have a Lambertian distribution relative to the optical axes of the one or more LEEs 310 (e.g., the z-axis.) The light guide 330 can be made from a solid, transparent material. For example, the material can be glass with a refractive index of about 1.5. As another example, the material can be plastic with a refractive index of about 1.5-1.6. Here, the light guide 330 is arranged to receive the light provided by the LEEs 310 at one end of the light guide 330 and to guide the received light in a forward direction, e.g., along the z-axis, from the receiving end to an opposing end of the light guide 330. Here, the distance D between the receiving end of the light guide 330 and its opposing end can be 5, 10, 20, 50 or 100 cm, for instance. A combination of (i) an angular range in which the light is received by the light guide 330 at the receiving end and (ii) a numerical aperture of the light guide 330 is configured such that the received light is guided from the receiving end to the opposing end through reflection off of light guide side surfaces of the light guide 330. Depending on the implementation, at least some, if not all, of this reflection is via total internal reflection (TIR). In some implementations, the numerical aperture of the light guide 330 is such that all light provided by the LEEs 310 in the angular range 115 can be injected directly into the light guide 330 at its receiving end.

Figure 3B:
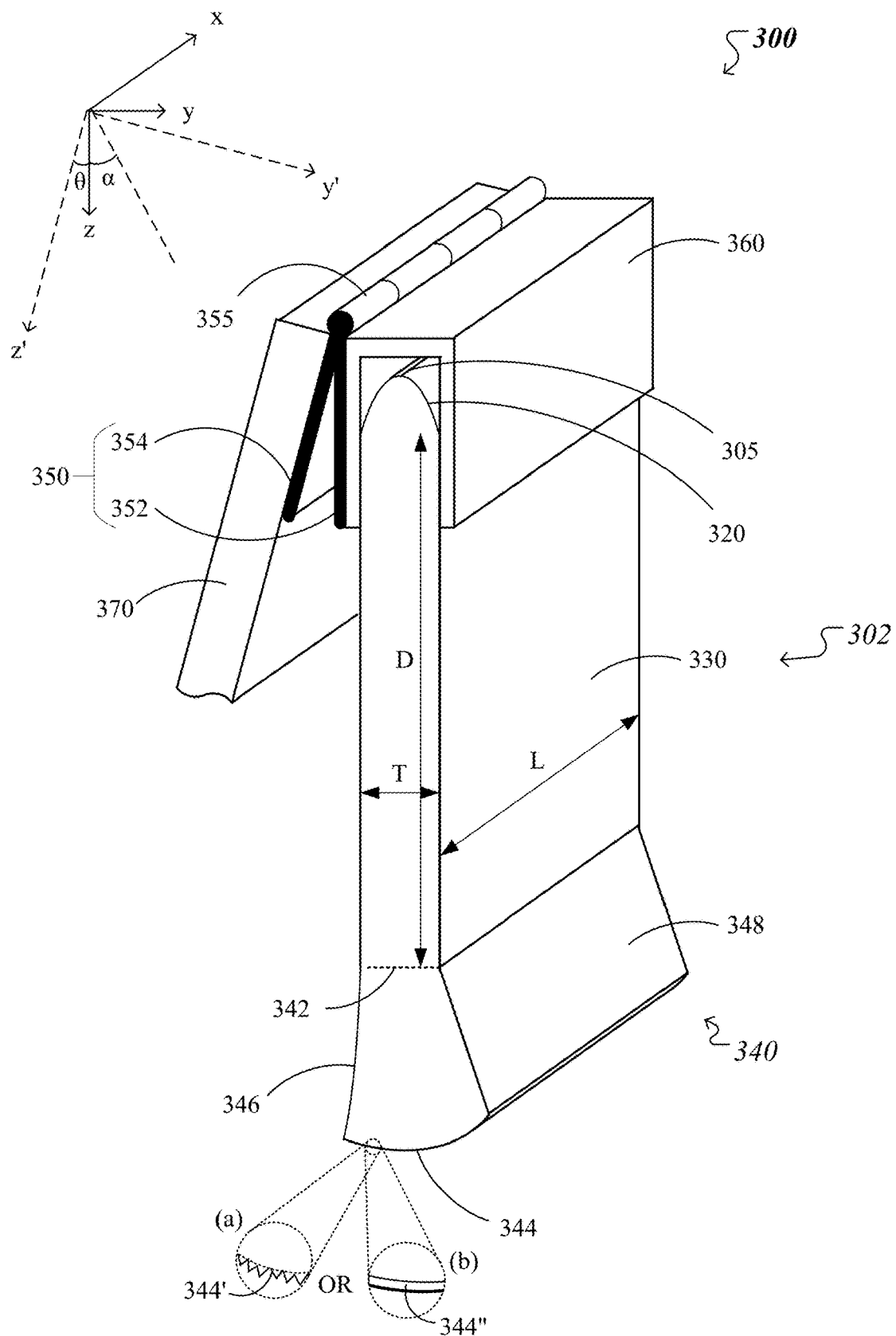

In some implementations, the illumination device 300 includes a light guide luminaire module 302 that has one or more optical couplers 320, as shown in in FIG. 3B, for instance. In such cases, the one or more optical couplers 320 receive the light from the LEEs 310 within the first angular range 115 and collimate the received light within a second angular range 125 in the forward direction. The one or more optical couplers 320 are shaped to transform the first angular range 115 into the second angular range 125 via total internal reflection, specular reflection or both. Moreover, the one or more optical couplers 320 can include a solid transparent material for propagating light from an input end to an output end of each of the one or more optical couplers 320. Here, the divergence of the second angular range 125 is smaller than the divergence of the first angular range 115. As such, the divergence of the second angular range 125 is selected such that all light provided by the coupler(s) 320 in the angular range 125 can be injected into the light guide 330 at its receiving end.

Referring now to FIGS. 3A-3B, one or more of the light guide side surfaces can be planar, curved or otherwise shaped. The light guide side surfaces can be parallel or non-parallel. In embodiments with non-parallel light guide side surfaces, a third angular range 135 of the guided light at the opposing end of the light guide 330 is different than the angular range 115 (when the light guide 330 receives the light directly from the LEEs 310) or 125 (when the light guide 330 receives the light from the couplers 320) of the light received at the receiving end. Here, the light guide side surfaces can be optically smooth to allow for the guided light to propagate forward (e.g., in the positive direction of the z-axis) inside the light guide 330 through TIR. In this case, the light guide side surfaces are shaped and arranged with respect to the z-axis and each other such that the guided light impinges on the light guide side surfaces at incident angles larger than a critical angle over the entire distance D from the input end the output end of the light guide 330. In embodiments with parallel light guide side surfaces, whether the light guide 330 is solid or hollow, the third angular range 135 of the guided light at the opposing end of the light guide 330 has at least substantially the same divergence as the angular range 115 (when the light guide 330 receives the light directly from the LEEs 310) or 125 (when the light guide 330 receives the light directly from the couplers 320) of the light received at the receiving end.

Additionally, the length D of the light guide 330 (along the z-axis), a width L of the light guide 330 (along the x-axis) and a thickness T of the light guide 330 (along the y-axis) are designed to homogenize the light emitted by the discrete LEEs 310—which are distributed along the x-axis—as it is guided from the receiving end to the opposing end of the light guide 330. In this manner, the homogenizing of the emitted light—as it is guided through the light guide 330—causes a change of a discrete profile along the x-axis of the first angular range 115 (when the light guide 330 receives the light directly from the LEEs 310) or the second angular range 125 (when the light guide 330 receives the light from the couplers 320) to a continuous profile along the x-axis of the third angular range 135 in which the discrete profile is partially or fully blurred.

Here, light in the third angular range 135 represents the input light for the light shaping optical article 340 and has a prevalent propagation direction along the z-axis. Similarly to the light shaping optical article 140 or 240, the light shaping optical article 340 is made from a solid, transparent material. For example, the material can be glass with a refractive index of about 1.5. As another example, the material can be plastic with a refractive index of about 1.5-1.6. The light shaping optical article 340 has an input surface 342 that is coupled to the output end of the light guide 330 to receive the guided light. The input surface 342 of the light shaping optical article 340 adjacent to the output edge of the light guide 330 is optically coupled to the output edge. For example, the light shaping optical article 340 can be affixed to light guide 330 using an index matching fluid, grease, or adhesive. In some implementations, light shaping optical article 340 is fused to light guide 330 or they are integrally formed from a single piece of material.

Moreover, the light shaping optical article 340 includes a convex output surface 344, a concave first side surface 346 and a second side surface 348. As described above in connection with FIGS. 1A-1D and 2A-2F, a combination of (i) an optical power of the concave first side surface 346, (ii) an optical power of the convex output surface 344 and (iii) relative arrangements between the convex output surface 344 and each of the light guide direction (here the z-axis) and the concave first side surface 346 of the light shaping optical article 340 determines the divergence of light in the output angular range 145 and a tilt angle α of prevalent propagation direction of the light in the output angular range 145 relative to prevalent propagation direction of light in the third angular range 135.

In this manner, the one or more optical couplers 320, light guide 330 and the light shaping optical article 340 of the light guide luminaire module 302 are arranged and configured to translate and redirect light emitted by LEEs 310 away from the LEEs before the light is output into the ambient environment. The spatial separation of the place of generation of the light, also referred to as the physical (light) source, from the convex output surface 344—where light is extracted from the light guide luminaire module 302—also referred to as a virtual light source or a virtual filament, can facilitate design of the light guide luminaire module 302. In this manner, a virtual filament can be configured to provide substantially non-isotropic light emission with respect to planes parallel to an optical axis of the light guide luminaire module 302 (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 310, with their predetermined optical, thermal, electrical and mechanical constraints, from the place of light extraction, may facilitate a greater degree of design freedom of the light guide luminaire module 302 and allows for an extended optical path, which can permit a predetermined level of light mixing before light is output from the light guide luminaire module 302.

In the example illustrated in FIG. 3A, the hinging element 350 of the illumination device 300 includes a first hinging portion 352 coupled with one of the side surfaces of the light guide 330 of the light guide luminaire module 302 that is on the same side of the light guide as the concave first side surface 346 of the light shaping optical article 340. The hinging element 350 further includes a second hinging portion 354 connected to the first hinging portion 352. The first hinging portion 352 and the second hinging portion 354 are connected together at a pivot 355 orthogonal to the prevalent propagation direction of light in the third angular range 135 (here, the z-axis) and the prevalent propagation direction of light in the output angular range 145. In some implementations, the pivot 355 can include angular displacement actuators for adjusting the tilt angle θ in increments of Δθ=0.1, 0.5, or 1°. In some implementations, the hinging element 350 can be configured as a friction hinge and provide a continuous resilient pivot.

In this manner, the pivot 355 is configured to adjustably tilt the light guide 330 relative to the second hinging portion 354 by an additional tilt angle θ, here in an angular direction opposing the tilt angle α. As such, the prevalent propagation direction of output light in the output angular range 145 is tilted relative to the second hinging portion 354 by a sum of the tilt angle and the additional tilt angle, α+θ. In a Cartesian coordinate system (x,y',z') rotated about the x-axis of the Cartesian coordinate system (x,y,z), a tilt angle between the prevalent propagation direction of output light in the output angular range 145 and the second hinging portion 354 is equal to the sum of the tilt angle and the additional tilt angle, α+θ.

In the example illustrated in FIG. 3B, the illumination device 300 further includes a rail 360 arranged and configured to support the light guide luminaire module 302. Here, the rail 360 has a U profile in the (y,z) plane and is elongated along the x-axis. A surface of the rail 360 that is parallel to the (x,y) plane is disposed adjacent to the substrate 305 of the light guide luminaire module 302, and the surfaces of the rail 360 that are parallel to the (x,z) plane are coupled to the side surfaces of the light guide 330 along a top fraction of the length D of the light guide 330. The top fraction can be 10, 30 or 50% of D, for instance.

Further in the example illustrated in FIG. 3B, the first hinging portion 352 of the hinging element 350 includes a plate. Here, the first hinging portion 352 is attached to one of the surfaces of the rail 360 that are parallel to the (x,z) plane on the same side of the light guide 330 as the concave side surface 346 of the light shaping optical article 340. Furthermore, the second hinging portion 354 of the hinging element 350 includes a plate. The respective plates of the first and second hinging portions 352, 354 of the hinging element 350 are rotatably coupled to each other at the pivot 355. Furthermore in the example illustrated in FIG. 3B, the illumination device 300 is coupled to a mount 370 parallel to the (x,z') plane by attaching the second hinging portion 354 to the mount 370. In this manner, the hinging element 350 tilts the prevalent propagation direction of the guided light in the third angular range 135 by a tilt angle θ relative to the mount 370, and the light shaping optical article 340 tilts the already tilted prevalent propagation direction of the guided light in the third angular range 135 by a tilt angle α relative to the light guide 330. As a cumulative effect, the illumination device 300 outputs light in the output angular range 145 having a prevalent propagation direction that is tilted by a cumulative angle θ+α relative to the mount 370.

Figure 3C:
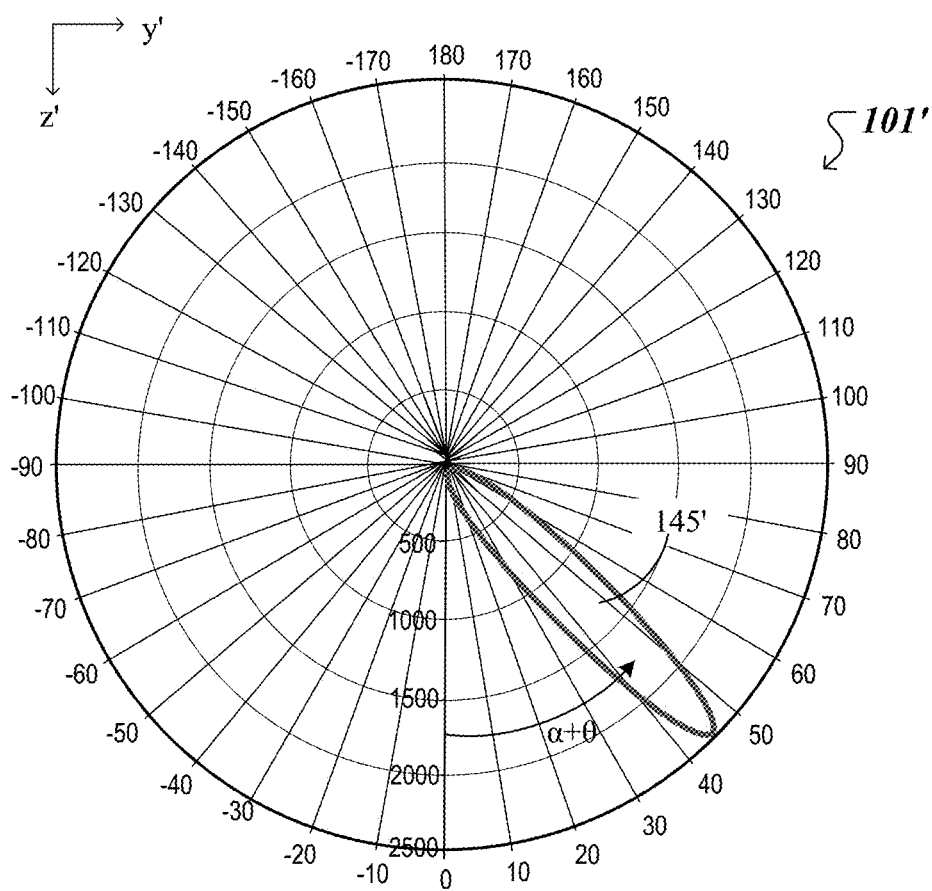

FIG. 3C shows a light intensity distribution 101' of the light output by the illumination device 300 in the (y'-z') plane. Note that the z'-axis (parallel to the second hinging portion 354) is rotated about the x-axis relative to the z-axis (parallel to light guide 330). In some implementations, the z'-axis can be aligned along a target surface 190, e.g., along a wall. A lobe 145' of the light intensity distribution 101' represents the light output by the illumination device 300 in the output angular range 145. A bisector of the lobe 145' corresponds to the prevalent propagation direction of light the output angular range 145. Here, the bisector of the lobe 145' is tilted by a tilt angle α+θ≈45° relative to the z'-axis. For example, θ≈5° represents the tilt of the prevalent propagation direction of the guided light in the third angular range 135 relative to the z'-axis as caused by the pivot 355, and α≈40° represents the tilt of the prevalent propagation direction of the output light in the output angular range 145 relative to the z-axis as caused by the light shaping optical article 340. Useful tilt angles α+θ may depend on the lighting application. A width at half-max of the lobe 145' corresponds to the divergence of light the output angular range 145. Here, the width at half-max of the lobe 145' has a value of about 20°.

An illumination system that includes the illumination device 300 can be recessed in a ceiling at a desired distance from the target wall to operate as a wall wash, wall grazer or other lighting fixture, for example.

Figure 4A:
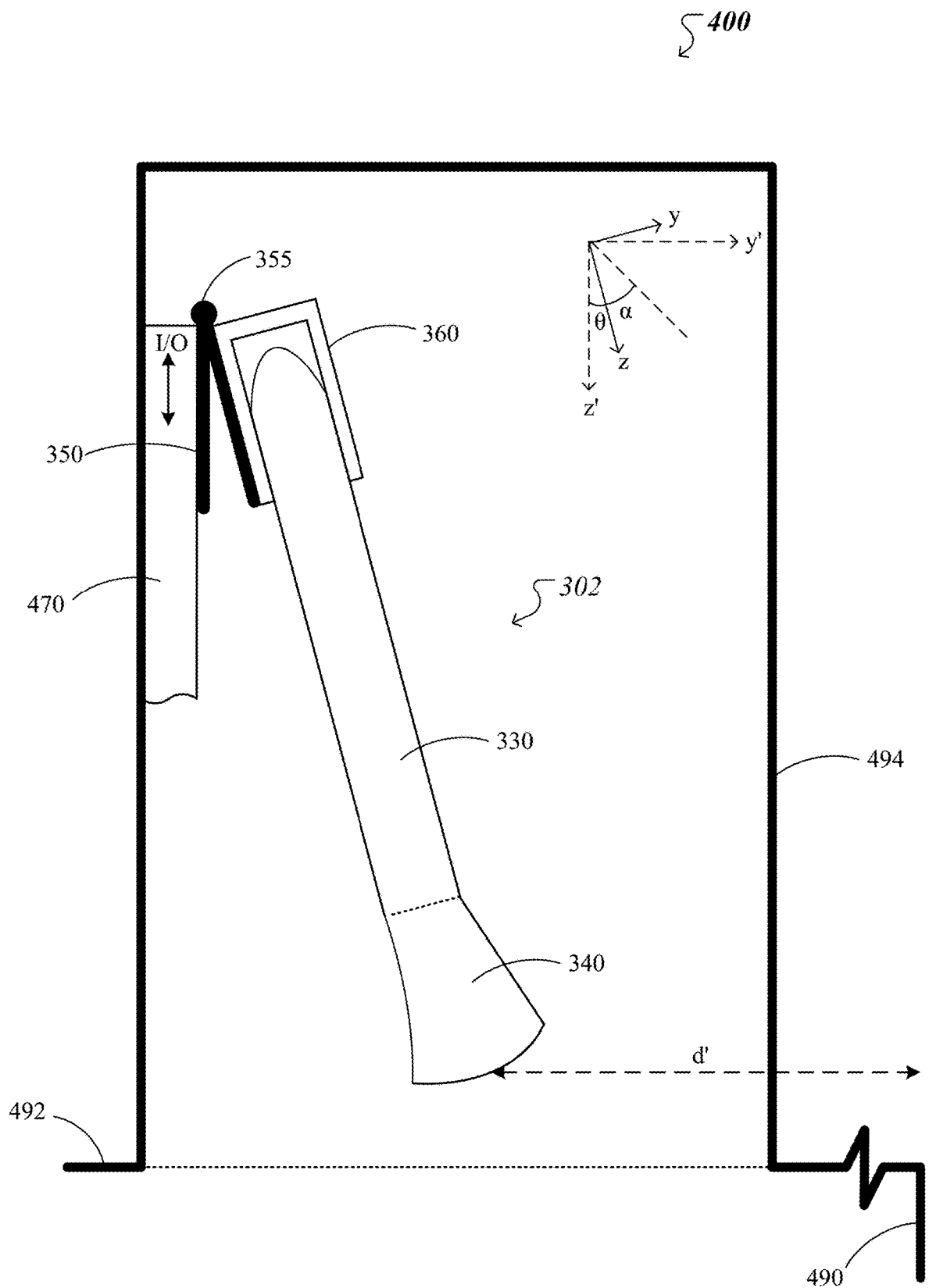
FIGS. 4A-4D show aspects of an example of a wall wash luminaire that includes the illumination device from FIGS. 3A-3B.

(iii) Wall Wash Luminaire Based on Illumination Device(s) with Light Guide Luminaire Module and Hinging Element FIG. 4A is a block diagram of an example of an illumination system 400 based on one or more illumination devices, each of which includes a light guide luminaire module 302 and a hinging element 350. In this example, the illumination device is implemented as the illumination device 300 described above in connection with FIGS. 3A-3B. The illumination system 400 further includes a housing 494. The housing 494 can be configured to support one or more illumination devices at predetermined distances (e.g., along the y'-axis) from a target surface 490 from a wall, panel, and/or from each other. In the example illustrated in FIG. 4A, the housing 494 of the illumination system 400 is recessed inside a ceiling 492. Further in this example, the ceiling 492 and the wall 490 are respectively orthogonal and parallel to the z'-axis. The illumination system 400 also includes a mount 470 to attach the illumination device(s) to the housing 494. In this example, the mount 470 is aligned parallel to the wall 490, along the z'-axis.

Each of the illumination devices of the illumination system 400 includes a rail 360 that supports the light guide luminaire module 302. The light guide luminaire module 302 includes a light guide 330 and a light shaping optical article 340. Here, the light shaping optical article 340 is implemented as the light shaping optical article 240 described above in connection with FIGS. 2A-2F. A first hinging portion of the hinging element 350 is attached to a surface of the rail 360 that is parallel to the light guide 330 and on the same side of the light guide 330 as the first concave surface of the light shaping optical article 340. A second hinging portion of the hinging element 350 is attached to the mount 470. The pivot 355 of the hinging element 350 orients the light guide 330 (which is parallel to the z-axis) at a tilt angle θ relative the z'-axis. The light shaping optical article 340 further tilts the light guided by the light guide 330 by an additional tilt angle α (relative the z-axis) for a total tilt angle θ+α relative the z'-axis. In this manner, a prevalent propagation direction (represented by dashed-line) of light output by the illumination system 400 is tilted by an angle θ+α relative to the z'-axis.

The light guide luminaire module 302 and the hinging element 350, as well as the housing 494, are elongated along the x-axis. A position of the housing 494 can vary relative the wall 490. In this manner, a distance along y'-axis between output surface of the light shaping optical article 340 and the wall 490 is d'.

Moreover, in this example, a position of the mount 470 along a side surface of the housing 494 can be adjusted using an adjustment element I/O, such that output surface of the light shaping optical article 340 is recessed inside the housing 494 by a desired distance relative to a level of the ceiling 492. The adjustment element I/O can include linear displacement actuators for adjusting a distance z' from the level of the ceiling 492 in increments of Δz=0.1, 0.5, or 1 cm.

Figure 4B:
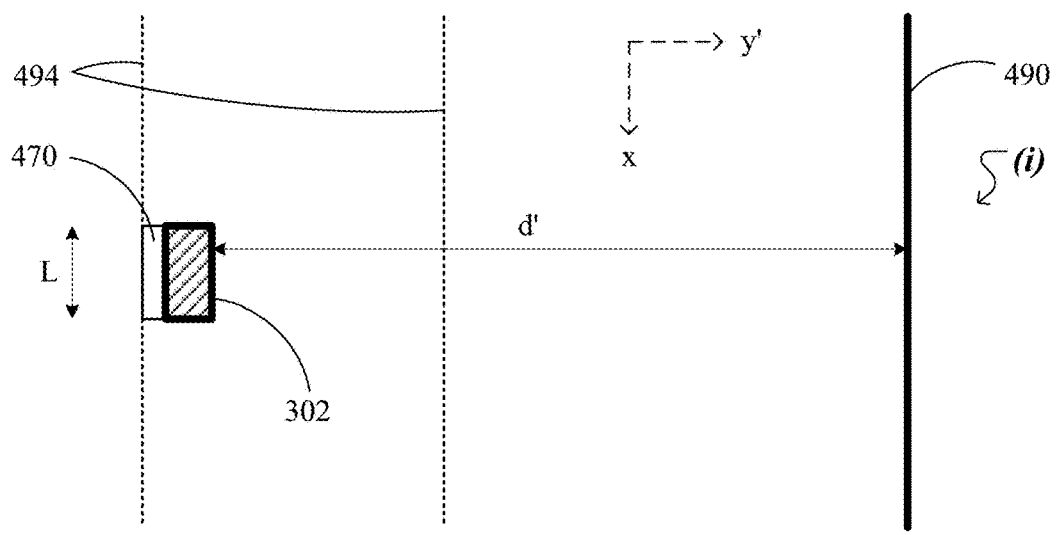

FIG. 4B shows a view in the (x,y')-plane of an arrangement (i) of the illumination system 400. In the arrangement (i), the illumination system 400 includes a single illumination device attached to a side surface of the housing 494 through the mount 470. In this example, a width L (along the x-axis) of the light guide luminaire module 302 of the illumination device is about 60 cm. Note that respective length scales along the x-axis and along the y'-axis are different in FIG. 4B. Dimensions of components such as the housing(s) and the illumination device may not be to scale and/or exaggerated relative to one another even within the same direction.

Figure 4C:
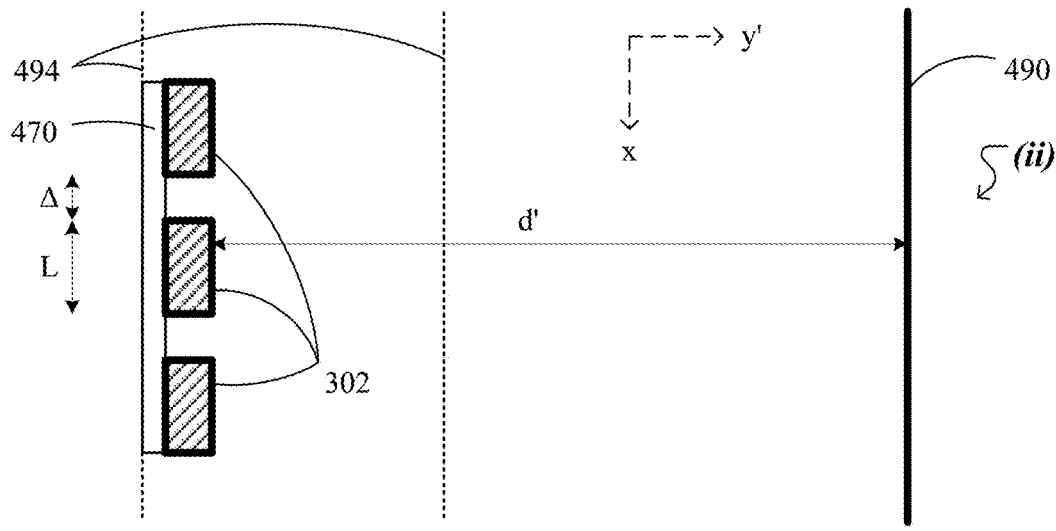

FIG. 4C shows a view in the (x-y')-plane of an arrangement (ii) of the illumination system 400. In the arrangement (ii), the illumination system 400 includes three illumination devices attached to a side surface of a single housing 494 through the mount 470. Alternatively, each illumination device can have its own housing (not illustrated). Here, a width L (along the x-axis) of the light guide luminaire module 302 of each of the illumination devices is about 60 cm, and a separation A between light guide luminaire modules 302 of adjacent illumination devices is about 60 cm. Note that respective length scales along the x-axis and along the y'-axis are different in FIG. 4C.

Figure 4D:
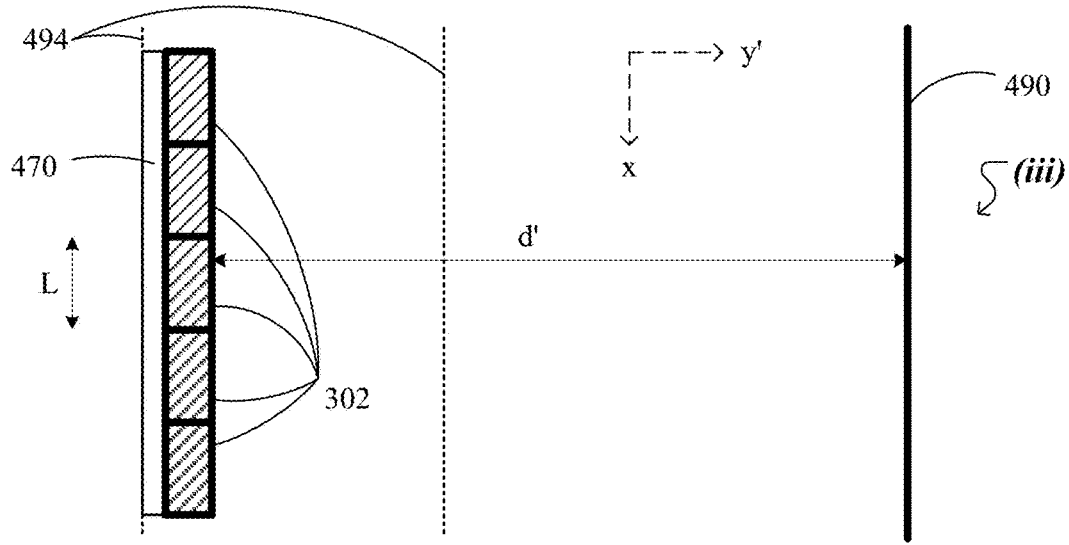

FIG. 4D shows a view in the (x-y')-plane of an arrangement (iii) of the illumination system 400. In the arrangement (iii), the illumination system 400 includes five illumination devices attached to a side surface of a single housing 494 through the mount 470. Here, a width L (along the x-axis) of the light guide luminaire module 302 of each of the illumination devices is about 60 cm, and there is no separation A between light guide luminaire modules 302 of adjacent illumination devices: Δ=0. Note that respective length scales along the x-axis and along the y'-axis are different in FIG. 4D.

Illumination devices 300 and illumination systems 400 have been described above that use a light guide luminaire module 302 in conjunction with a hinging element 350 to further increase a prevalent propagation direction tilt of the light output by the light guide luminaire module 302 when the prevalent propagation direction is insufficiently tilted for uniformly illuminating a target surface 190, e.g., a certain portion of a wall. Other ways to further increase the prevalent propagation direction tilt of light output by a light guide luminaire module 302 are described below.

Figure 5A:
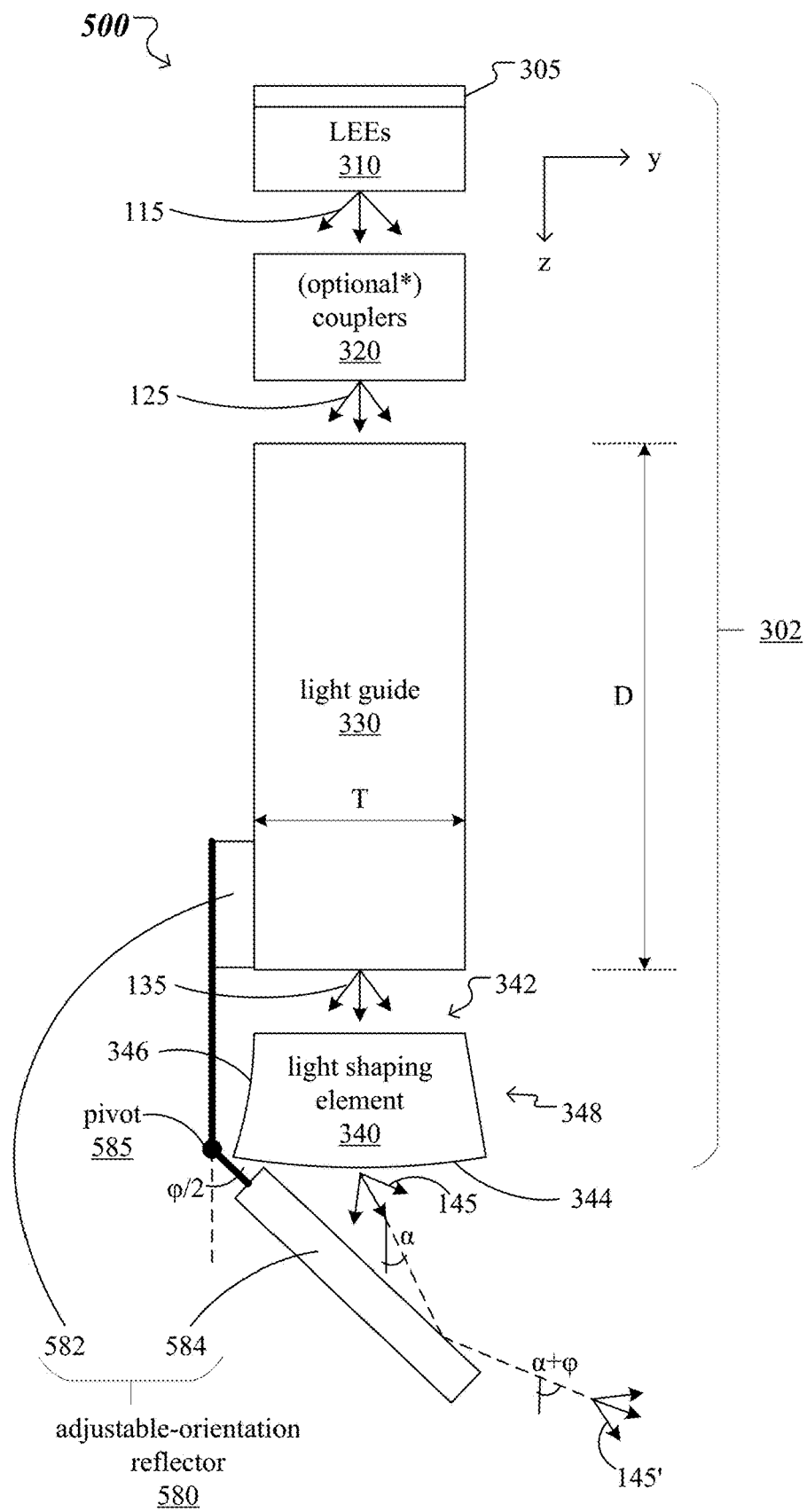
FIGS. 5A-5C show aspects of another example of an illumination device based on a light guide luminaire module that includes a light shaping optical article.
Figure 5B:
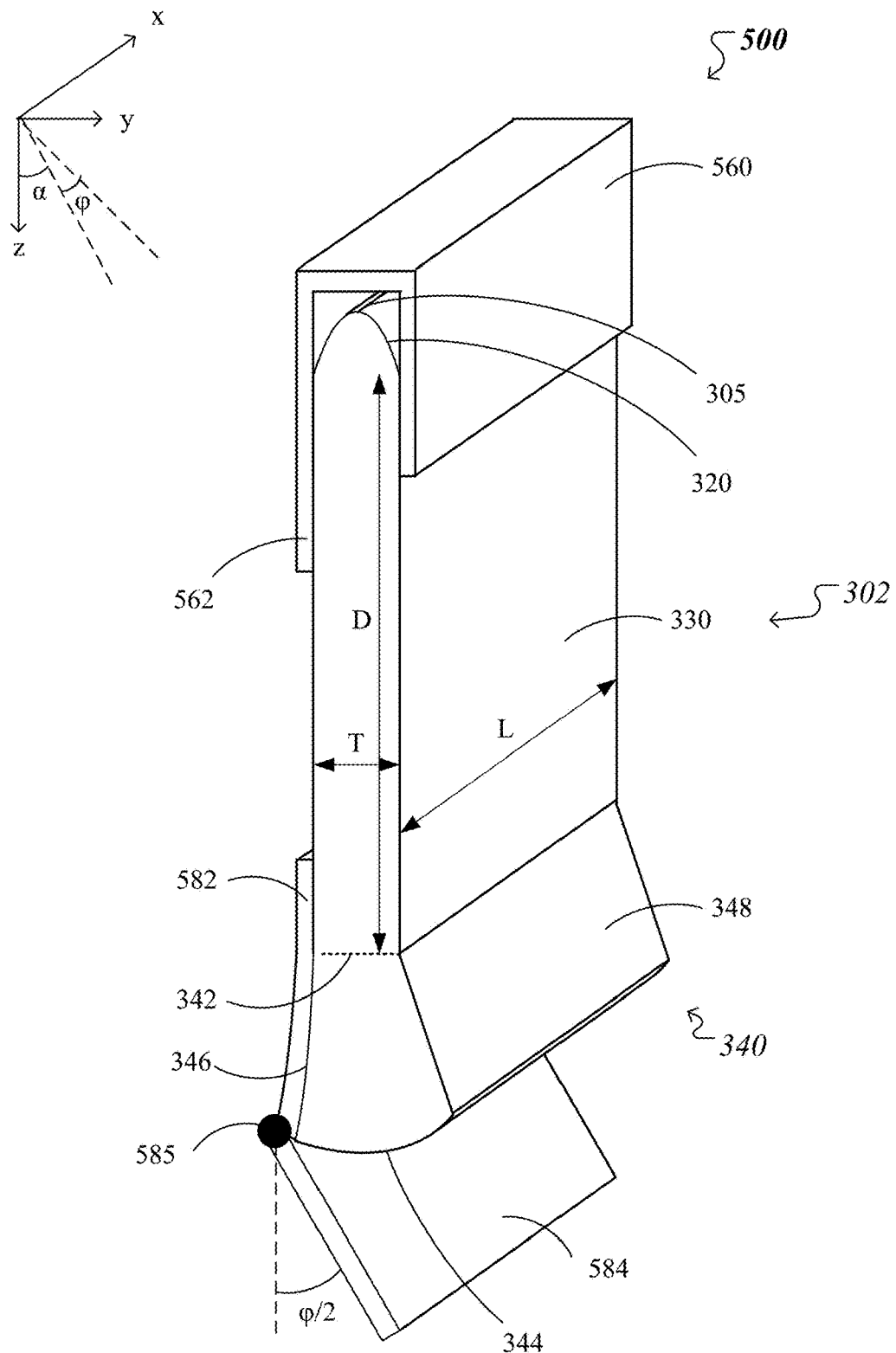

(iv) Another Illumination Device Based on Light Guide Luminaire Module with Light Shaping Optical Article FIGS. 5A and 5B show aspects of an example of another illumination device 500 based on a light guide luminaire module 302 that includes a light shaping optical article 340. The light shaping optical article 340 can be implemented as a light shaping optical article 140 or 240 described in connection with FIG. 1A or 2A, for example.

The light guide luminaire module 302 further includes a substrate 305, one or more light emitting elements (LEEs) 310 and a light guide 330. The light guide 330 guides the light provided by the LEEs 310 along a length D. Optionally, the light guide luminaire module 302 further includes one or more optical couplers 320, such that the light guide 330 is coupled at its input end to the optical coupler(s) 320 and at its output end to the light shaping optical article 340. These components of the light guide luminaire module 302 as well as their respective and combined functionalities have been described in detail in connection with FIGS. 3A-3B. As noted above, a combination of (i) an optical power of a concave first side surface 346 of the light shaping optical article 340, (ii) an optical power of a convex output surface 344 of the light shaping optical article 340 and (iii) relative arrangements between the convex output surface 344 and each of a light guide direction (here the z-axis) and the concave first side surface 346 determines a divergence of light in an output angular range 145 and a tilt angle α of prevalent propagation direction of the light in the output angular range 145 relative to prevalent propagation direction of the guided light in a third angular range 135.

The illumination device 500 includes, in addition to the light guide luminaire module 302, an adjustable orientation reflector 580 arranged and configured to reorient a prevalent propagation direction of the light output in the output angular range 145 by an additional angle φ≠0. In this manner, light is output by the illumination device 500 in a modified output angular range 145' along a prevalent propagation direction having a cumulative tilt angle α+φ relative to the axis z.

In the examples illustrated in FIGS. 5A and 5B, the adjustable orientation reflector 580 includes a reflector support 582 and a reflector element 584. In this example, the reflector support 582 is disposed adjacent one of the side surfaces of the light guide 330. The reflector support 582 is located on the same side of the light guide as the concave first side surface 346 of the light shaping optical article 340. The reflector support 582 and the reflector element 584 are connected together at a pivot 585 orthogonal to the prevalent propagation direction of the guided light in the third angular range 135 (here, the z-axis) and the prevalent propagation direction of the output light in the output angular range 145. The reflector support 582, the reflector element 584 and the pivot 585 extend over the width L of the light guide luminaire module 302 along the x-axis.

The pivot 585 can be arranged relative to the light shaping optical article 340 adjacent to an intersection of the concave first side surface 346 and the convex output surface 344. In some implementations, the pivot 585 can include angular displacement actuators for adjusting the tilt angle φ in discrete increments of Δφ=0.1, 0.5, or 1°, for example, or via a continuous pivot. The pivot 585 is configured to adjustably tilt the reflector element 584 relative to the light guide direction (here the z-axis) by a reflector angle φ/2. The reflector angle φ/2 can be 5, 8, or 10°, for instance. In this manner, at least a portion of the light output by the light shaping optical article 340 in the output angular range 145 reflects off the reflector element 584, such that the reflected light prevalently propagates in a direction that is tilted by a tilt angle φ relative to the prevalent propagation direction of the output light in the output angular range 145. The reflected light is provided by the illumination device 500 in the modified output angular range 145' and has a prevalent propagation direction that has a cumulative tilt angle α+φ relative to the axis z.

In some implementations, the reflector element 584 includes a plate having a width that spans the width L of the light guide luminaire module 302 along the x-axis and a length of 5, 10 or 15 cm, for instance. In some cases, the reflector element 584 is flat. In other cases, the reflector element 584 can be concave or convex. Moreover, the reflector element 584 can be formed from or coated with a reflective metal, e.g., Al, Ag, etc. In other cases, the reflector element 584 can be coated with reflective dielectric layers. As such, the reflector element 584 can be configured to reflect 95% or more of the light output by the light shaping optical article 340 that is incident onto the reflector element 584. Further, the reflector element 584 can be configured to specularly reflect incident light. Furthermore, the reflector element 584 can be configured to diffusely reflect incident light. In the latter cases, a diffusion pattern can be imprinted on or within the reflector element 584. Alternatively, a diffusion pattern can be provided as a film deposited on the reflector element 584. The degree of diffusion relative to the light incident on the reflector element 584 may be limited to a predetermined angular range of the light reflected therefrom.

In the example illustrated in FIG. 5A, the reflector support 582 is attached to a bottom fraction of one of the side surfaces of the light guide 330 that is on the same side of the light guide as the concave first side surface 346 of the light shaping optical article 340. In the example illustrated in FIG. 5B, the reflector support 582 can be attached to a side surface or opposing end surfaces (that are parallel to the y-z plane) of the light guide 330 or the light shaping optical article 340, for example. Further attachment configurations are described below. The reflector support may extend over a bottom fraction of the light guide 330 and/or the light shaping element 340 which can cover 10, 30 or 50% of D, for instance. The reflector support 582 and the reflector element 584 are rotatably coupled to each other at the pivot 585 which is located adjacent to the intersection of the concave first side surface 346 and the convex output surface 344 of the light shaping optical article 340.

Further in the example illustrated in FIG. 5B, the illumination device 500 includes a rail 560 arranged and configured to support the light guide luminaire module 302. Here, the rail 560 has a U profile in the (y,z) plane and is elongated along the x-axis. A surface of the rail 560 that is parallel to the (x,y) plane is disposed adjacent to the substrate 305 of the light guide luminaire module 302, and surfaces of the rail 360 that are parallel to the (x,z) plane are coupled to the side surfaces of the light guide 330 along a top fraction of the length D of the light guide 330. The top fraction can be 10, 30 or 50% of D, for instance. In some implementations, one of the surfaces of the rail 560—that is on the same side of the light guide 330 as the concave first side surface 346 of the light shaping optical article 340—can extend over a larger fraction of the light guide than the opposing rail surface. The former is referred to as an extended rail surface 562. In some cases, the extended rail surface 562 can extend over the entire length D of the light guide 330 and the entire length of the concave first side surface 346 of the light shaping optical article 340. In such cases, the extended rail surface 562 is used as the reflector support 582: Here, the pivot 585 can be placed at the end of the extended rail surface 562 and the reflector element 584 can be connected to the extended rail surface 562 at the pivot 585. Such a case is described below in connection with FIG. 6A.

Figure 5C:
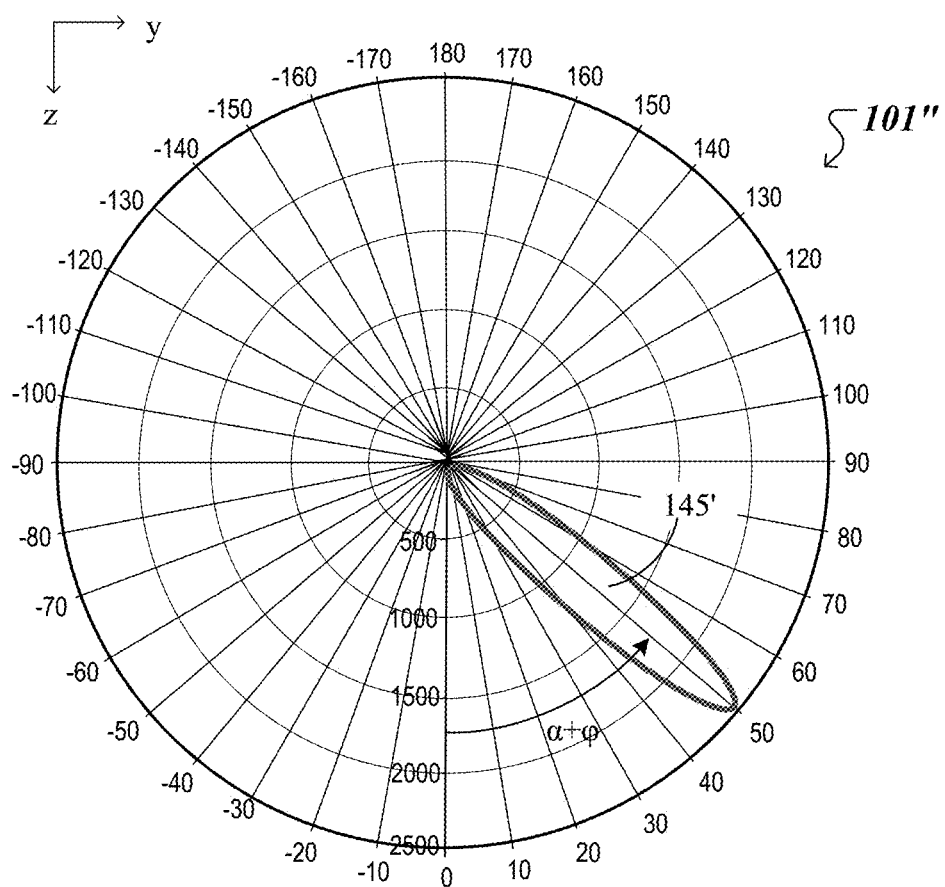

FIG. 5C shows a light intensity distribution 101" of the light output by the illumination device 500 in the (y-z) plane. Note that the z-axis is parallel to the light guide 330. In some implementations, the z-axis can be aligned along a target surface 190, e.g., along a wall. A lobe 145' of the light intensity distribution 101" represents the light output by the illumination device 500 in the modified output angular range 145'. A bisector of the lobe 145' corresponds to the prevalent propagation direction of light the modified output angular range 145'. Here, the bisector of the lobe 145' is tilted by a tilt angle $\alpha+\varphi \approx 50°$ relative to the z-axis. For example, $\varphi \approx 10°$ represents the tilt of the prevalent propagation direction of the output light in the modified output angular range 145' relative to the prevalent propagation direction of the output light in the output angular range 145 as caused by the reflector element 584 tilted at an angle $\varphi/2 \approx 520$, and $\alpha \approx 40°$ represents the tilt of the prevalent propagation direction of the output light in the output angular range 145 relative to the z-axis as caused by the light shaping optical article 340. A width at half-max of the lobe 145' corresponds to the divergence of light the modified output angular range 145'. Here, the width at half-max of the lobe 145' has a value of about 20°.

An illumination system that includes the illumination device 500 can be recessed in a ceiling at a desired distance from the target wall to operate as a wall wash. Moreover, the illumination device 500 can be combined with the illumination device 300 into a wall wash luminaire as described below.

Figure 6A:
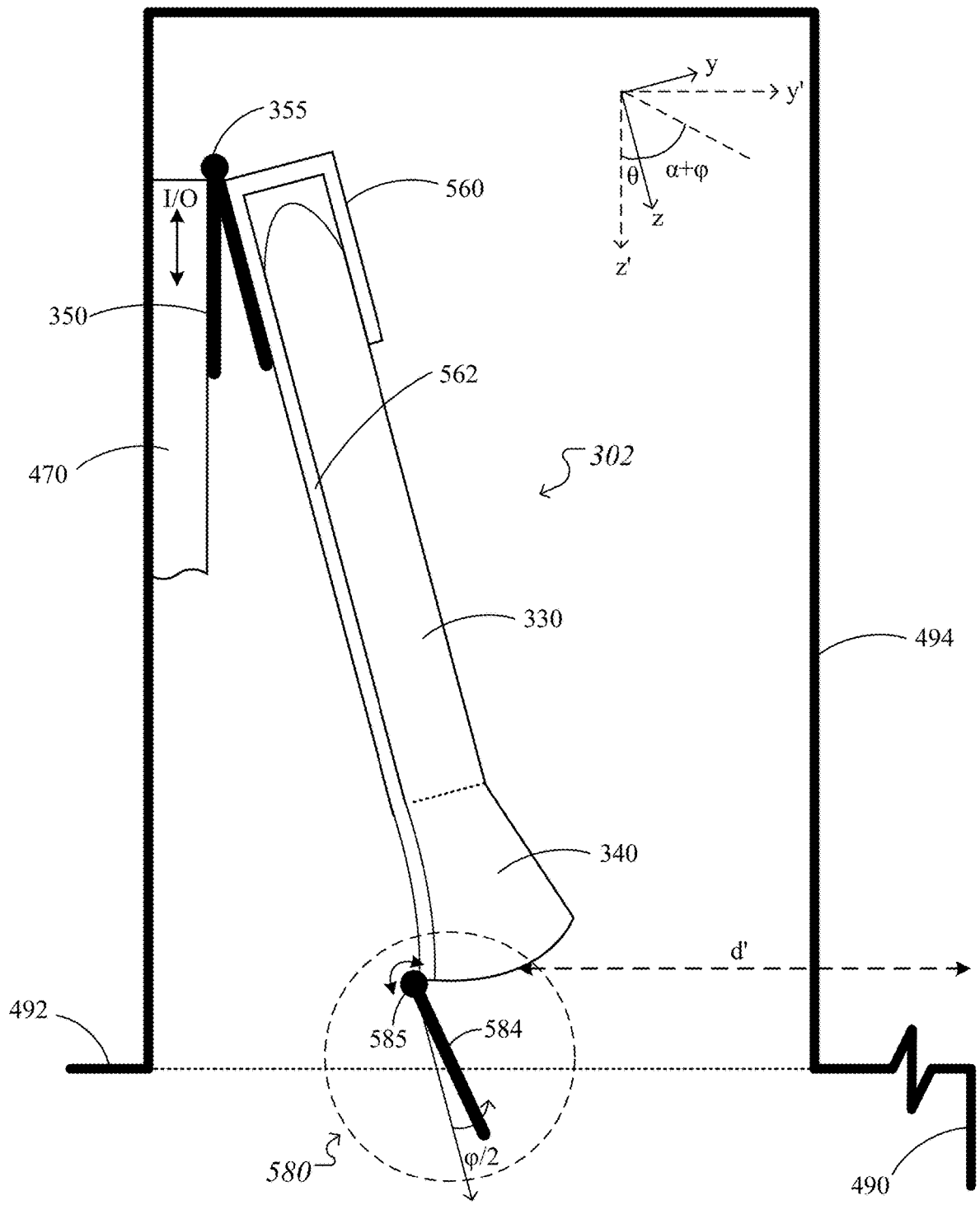
FIGS. 6A-6B show aspects of another example of a wall wash luminaire that includes a combination of the illumination devices of FIGS. 3A and 5A.

(v) Wall Wash Luminaire Based on Illumination Device(s) with Light Guide Luminaire Module, Hinging Element and Adjustable-Orientation Reflector FIG. 6A is a block diagram of an example of an illumination system 600 based on one or more illumination devices, each of which includes a light guide luminaire module 302, a hinging element 350 and an adjustable-orientation reflector 580. In this example, the illumination device is implemented as a combination the illumination device 300 described above in connection with FIGS. 3A-3B and the illumination device 500 described above in connection with FIGS. 5A-5B. The illumination system 600 further includes a housing 494 to support the illumination device(s) at a predetermined distance (e.g., along the y'-axis) from a target surface 490 (e.g., a wall, panel, etc.) In the example illustrated in FIG. 6A, the housing 494 of the illumination system 600 is recessed inside a ceiling 492. Further in this example, the ceiling 492 and the wall 490 are respectively orthogonal and parallel to the z'-axis. The illumination system 600 also includes a mount 470 to attach the illumination device(s) to the fixture 494. In this example, the mount 470 is aligned parallel to the wall 490, along the z'-axis. Moreover, the illumination system 600 can be arranged in any of the arrangements (i), (ii) or (iii) described above in connection with FIGS. 4B-4D.

Each of the illumination devices of the illumination system 600 includes a rail 560 that supports the light guide luminaire module 302. The rail can also extend across multiple illumination devices, for example. The light guide luminaire module 302 includes a light guide 330 and a light shaping optical article 340. Here, the light shaping optical article 340 can be implemented as the light shaping optical article 240 described above in connection with FIGS. 2A-2F, for example. In the example illustrated in FIG. 6A, the rail 560 has an extended rail surface 562 which extends over the entire length of the light guide 330 and the entire length of the concave first side surface of the light shaping optical article 340. A first hinging portion of the hinging element 350 is attached to the extended rail surface 562. A second hinging portion of the hinging element 350 is attached to the mount 470. The pivot 355 of the hinging element 350 orients the light guide 330 (which is parallel to the z-axis) at a tilt angle θ relative the z'-axis. Here, the extended rail surface 562 also is used as a reflector support of the adjustable-orientation reflector 580. In this manner, the pivot 585 of the adjustable-orientation reflector 580 is located at a distal end of the extended rail surface 562 adjacent to an intersection of the concave first side surface and the convex output surface of the light shaping optical article 340. The pivot 585 orients the reflector element 584 of the adjustable-orientation reflector 580 at an angle φ/2 relative the light guide 330 (which is parallel to the z-axis).

In this manner, the light shaping optical article 340 tilts the guided light (which is tilted relative the z'-axis by a tilt angle θ) by an additional tilt angle α (relative the z-axis) for a total tilt angle θ+α relative the z'-axis of the prevalent propagation direction of the light output by the light shaping optical article 340. Further, the reflector element 584 (which is tilted by an angle φ/2 relative the z-axis) bends the light output by the light shaping optical article 340 (which is tilted by an angle α relative the z-axis) by an extra tilt angle φ (relative the z-axis). In this manner, a prevalent propagation direction (represented by dashed-line) of light output by the illumination system 600 is tilted by an angle θ+α+φ relative to the z'-axis.

The light guide luminaire module 302, the hinging element 350, the adjustable-orientation reflector 580, as well as the housing 494, are elongated along the x-axis. A position of the housing 494 can vary relative the wall 490. In this manner, a distance along y'-axis between output surface of the light shaping optical article 340 and the wall 490 is d'.

Moreover, a position of the mount 470 along a side surface of the housing 494 can be adjusted using an adjustment element I/O, such that the reflector element 584 is fully recessed inside the housing 494 relative to a level of the ceiling 492 or is partially protruding below the level of the ceiling 492. For example, half of the length of the reflector element 584 can protrude below the level of the ceiling 492. The adjustment element I/O can include linear displacement actuators for adjusting a distance z' from the level of the ceiling 492 in increments of Δz=0.1, 0.5, or 1 cm. In some implementations of the illumination system 600 in which the reflector element 584 is fully recessed inside the housing 494 relative to a level of the ceiling 492, an opening of the housing 494 can be covered with a transparent cover, that is even with the ceiling 492, to protect the components of the illumination system from dust and/or other air-borne debris.

Figure 6B:
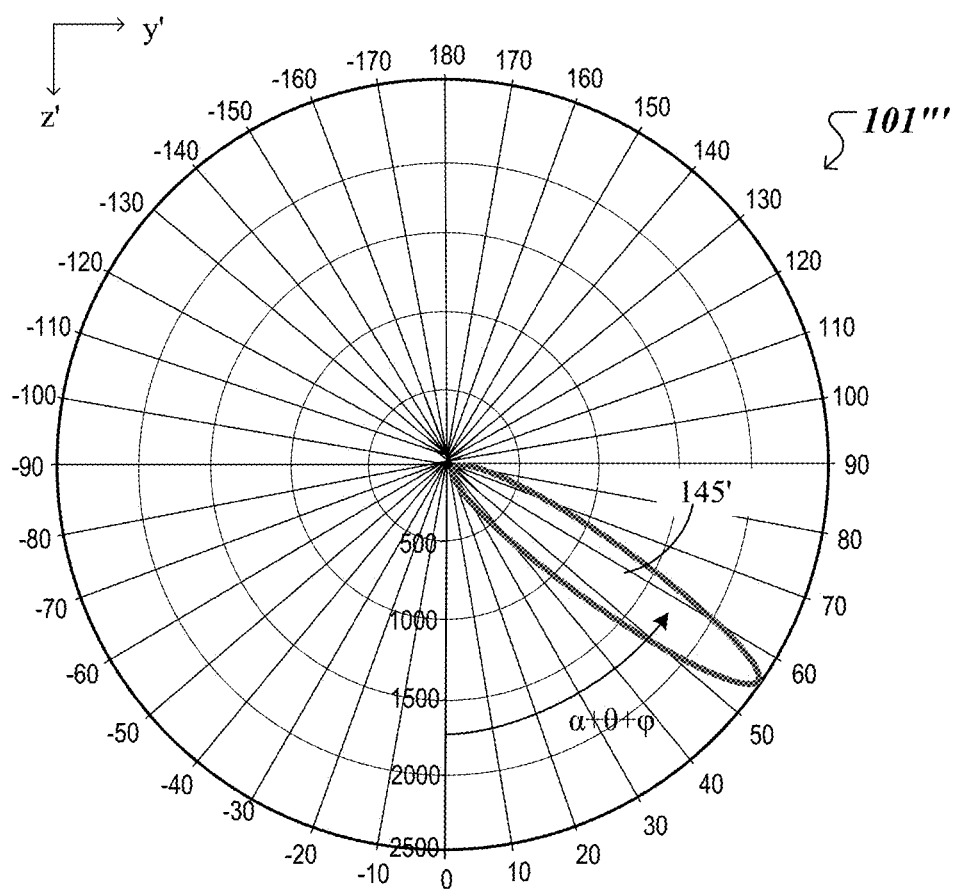

FIG. 6B shows a light intensity distribution 101''' of the light output by the illumination system 600 in the (y'-z') plane. Note that the z'-axis is parallel to the mount 470 and the light guide 330 is tilted by a tilt angle θ relative to the z'-axis. In some implementations, the z'-axis can be aligned along a target surface 190, e.g., along a wall. A lobe 145' of the light intensity distribution 101''' represents the light output by the illumination system 600 in the modified output angular range 145'. A bisector of the lobe 145' corresponds to the prevalent propagation direction of light the modified output angular range 145'. Here, the bisector of the lobe 145' is tilted by a tilt angle θ+α+φ≈55° relative to the z-axis. For example, θ≈5° represents the tilt of the prevalent propagation direction of the guided light in the third angular range 135 relative to the z'-axis as caused by the pivot 355, α≈40° represents the tilt of the prevalent propagation direction of the output light in the output angular range 145 relative to the prevalent propagation direction of the guided light in the third angular range 135 as caused by the light shaping optical article 340, and φ≈10° represents the tilt of the prevalent propagation direction of the output light in the modified output angular range 145' relative to the prevalent propagation direction of the output light in the output angular range 145 as caused by the reflector element 584 tilted at an angle φ≈5°. A width at half-max of the lobe 145' corresponds to the divergence of light the modified output angular range 145'. Here, the width at half-max of the lobe 145' has a value of about 20°.

Samples of the illumination devices 300 and 500 and of the illumination systems 400 and 600 have been fabricated and experiments have been conducted to evaluate their respective performance. Some of these experiments are summarized below.

(vi) Experimental Results

Wall wash luminaires corresponding to the illumination system 400 and the illumination system 600 were used to illuminate a wall that has a height of H=10'. The housing 494 of the illumination systems 400 and 600 were placed at various distances from the wall: d'=12", 18" and 24". These distances are also referred to as setback distances. Moreover, the performance of the illumination systems 400 and 600 was evaluated in each of the arrangements (i), (ii) and (iii) as shown in FIGS. 4B, 4C and 4D, respectively.

The LEEs 310 of the light guide luminaire modules 302 used in the illumination systems 400 and 600 were implemented as Luxeon Z LEDs: 3500K, 1101 m/W. The convex output surface 344 of the light shaping optical article 340 was covered with a diffuse film implemented as Brightview M PR05 TM. A width of the light guide luminaire modules 302 along the x-axis was L=60 cm.

Performance of the illumination systems 400 and 600 was simulated using a Lumileds rayfile with 2 million rays. Also, an assumption was used of 20% Lambertian scatter off the floor underneath the housing 494, in front of the wall 190.

Experimental results for illumination systems 400 and 600 placed at a setback distance d'=12" are summarized in Table 6.

TABLE 6

| Illumination system | Arrangement | Tilt θ (°) caused by hinging element 350 | Uniformity | Floor illumination (lm) | Wall illumination (lm) |
|---|---|---|---|---|---|
| 600 | (i) | 7 | 5:1 | 1155 | 2503 |
| 600 | (i) | 10 | 10:1 | 744 | 2899 |
| 600 | (i) | 14 | >10:1 | 332 | 3280 |
| 400 | (i) | 7 | 6:1 | 1311 | 2327 |
| 600 | (iii) | 7 | <4:1 | 5785 | 12517 |
| 600 | (ii) | 7 | <4:1 | 3467 | 7504 |

Note that, if the housing was placed at a setback distance d'=12", illumination systems 400 and 600 were optimized to provide wall washing with best uniformity when the light guide 330 of the light guide luminaire module 302 was tilted at a tilt angle θ=7° relative to a target wall surface.

Experimental results for illumination systems 400 and 600 placed at a setback distance d'=18" are summarized in Table 7.

TABLE 7

| Illumination system | Arrangement | Tilt θ (°) caused by hinging element 350 | Uniformity | Floor illumination (lm) | Wall illumination (lm) |
|---|---|---|---|---|---|
| 600 | (i) | 7 | <3:1 | 1602 | 2062 |
| 600 | (i) | 10 | 3:1 | 1121 | 2530 |
| 600 | (i) | 14 | 8:1 | 595 | 3028 |
| 400 | (i) | 7 | 5:1 | 1760 | 1881 |
| 600 | (iii) | 7 | 2:1 | 8028 | 10308 |
| 600 | (ii) | 7 | 2:1 | 4809 | 6179 |

Note that, if the housing was placed at a setback distance d'=18", illumination systems 400 and 600 were optimized to provide wall washing with best uniformity when the light guide 330 of the light guide luminaire module 302 was tilted at a tilt angle θ=10° relative to a target wall surface.

Experimental results for illumination systems 400 and 600 placed at a setback distance d'=24" are summarized in Table 8.

TABLE 8

| Illumination system | Arrangement | Tilt θ (°) caused by hinging element 350 | Uniformity | Floor illumination (lm) | Wall illumination (lm) |
|---|---|---|---|---|---|
| 600 | (i) | 7 | 2:1 | 2017 | 1720 |
| 600 | (i) | 10 | 2:1 | 1560 | 2150 |
| 600 | (i) | 14 | 3:1 | 925 | 2735 |
| 400 | (i) | 7 | 5:1 | 2175 | 1545 |
| 600 | (iii) | 7 | 2:1 | 10105 | 8570 |
| 600 | (ii) | 7 | 3:1 | 6059 | 5135 |

Note that, if the housing was placed at a setback distance d'=24", illumination systems 400 and 600 were optimized to provide wall washing with best uniformity when the light guide 330 of the light guide luminaire module 302 was tilted at a tilt angle θ=14° relative to a target wall surface.

It was observed that, while using the same arrangement (i), the illumination system 600 (with an adjustable orientation reflector 580) provided similar wall wash uniformity as the illumination system 400 (without an adjustable orientation reflector 580). However, the illumination system 600 provided better fill close to the ceiling than the illumination system 400.

The above experimental summary shows that uniformity better than 6:1 can be achieved, for both illumination systems 400 and 600 regardless of setback distance and/or arrangement (i), (ii) or (iii), by adjusting the tilt θ of the light guide 330 of the light guide luminaire module 302 relative to a target wall surface. Moreover, efficiencies larger than 90% have been achieved for both illumination systems 400 and 600 for various combinations of setback distance and/or arrangement (i), (ii) or (iii).

More detailed results of the noted experiments are described below.

Experimental Results for Illumination System 400

Figures 7A, 7B, 7C:
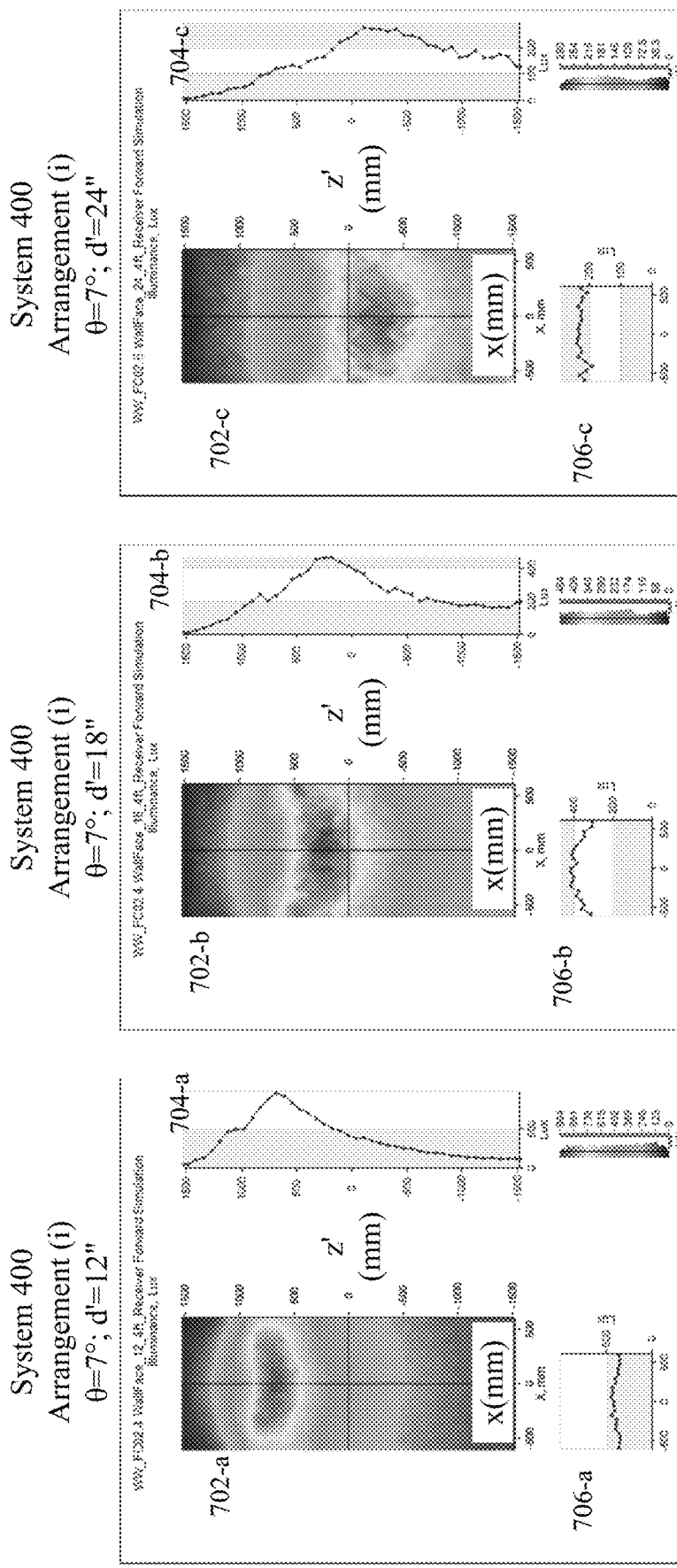
FIGS. 7A-7C show results of simulation of the wall wash luminaire from FIG. 4A in an arrangement of FIG. 4B.

FIG. 7A/7B/7C shows an illuminance (x,z')-contour plot 702-a/702-b/702-c of a 10'-wall illuminated by illumination system 400 in arrangement (i) while the light guide 330 of the light guide luminaire module 302 is tilted at a tilt angle θ=7° relative to the wall. FIG. 7A/7B/7C also shows a z'-axis cross-section 704-a/704-b/704-c that represents vertical variation of the illuminance of the wall through the center of the illumination system 400, and an x-axis cross-section 706-a/706-b/706-c that represents horizontal variation of the illuminance of the wall at half height.

In the example shown in FIG. 7A, the setback distance is d'=12". Here, the light intensity on a floor in front of the wall (underneath the housing 494 of the illumination system 400) is about 1300lm, and the vertical variation of the illuminance corresponds to a uniformity of 6:1. In the example shown in FIG. 7B, the setback distance is d'=18". Here, the light intensity on the floor is about 1750 lm, and the vertical variation of the illuminance corresponds to a uniformity of 5:1. In the example shown in FIG. 7C, the setback distance is d'=24". Here, the light intensity on the floor is about 2250 lm, and the vertical variation of the illuminance corresponds to a uniformity of 5:1.

The foregoing experimental results indicate the vertical uniformity provided by the illumination system 400 in arrangement (i) while the light guide 330 of the light guide luminaire module 302 is tilted at a tilt angle θ=7° relative to the wall. If it is desirable to further increase illuminance levels proximate the ceiling an illumination system with an adjustable-orientation reflector can be used.

Experimental Results for Illumination System 600

Figure 8C:
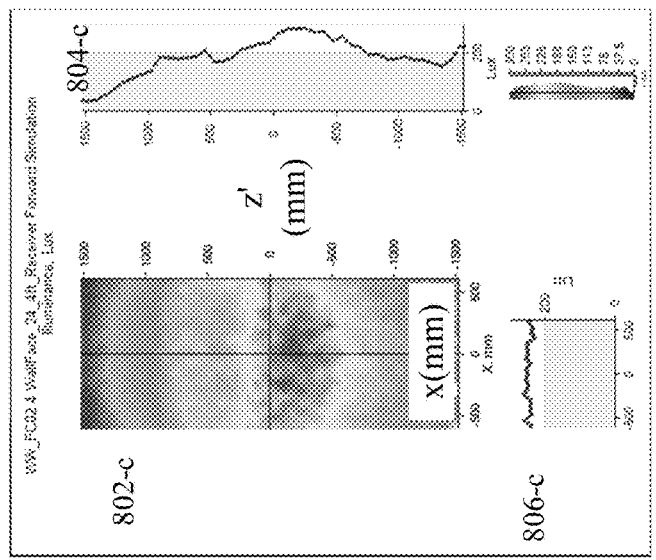
FIGS. 8A-8C, 9A-9C, 10A-10C and 11A-11D show results of simulation of the wall wash luminaire of FIG. 6 in the arrangement of FIG. 4B.
Figure 8B:
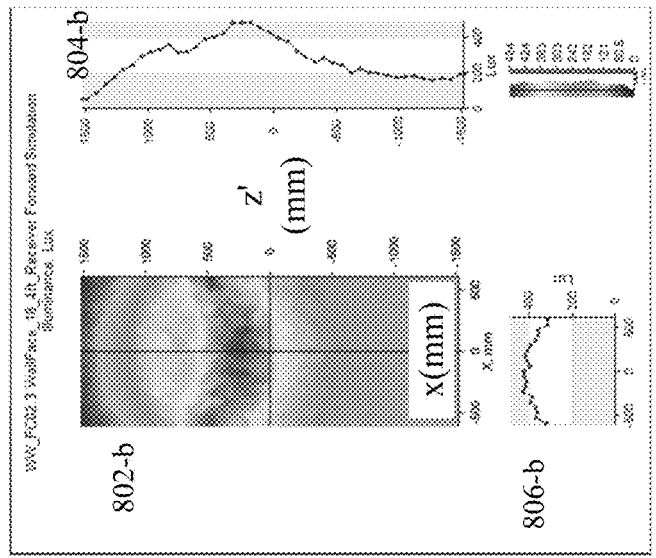
Figure 8A:
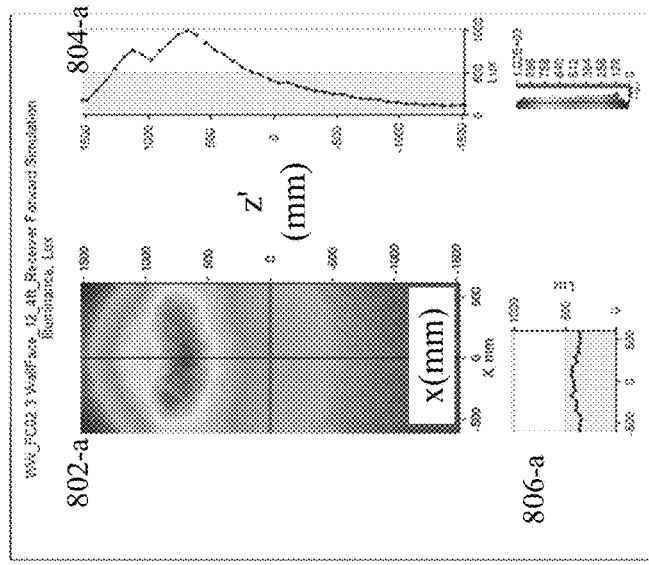

FIG. 8A/8B/8C shows an illuminance (x,z')-contour plot 802-a/802-b/802-c of a 10'-wall illuminated by illumination system 600 in arrangement (i) while the light guide 330 of the light guide luminaire module 302 is tilted at a tilt angle θ=7° relative to the wall. Here, at least a portion of the reflector element 584 of the adjustable-orientation reflector 580 protrudes, outside of the housing 494, below a level of the ceiling. FIG. 8A/8B/8C also shows a z'-axis cross-section 804-a/804-b/804-c that represents vertical variation of the illuminance of the wall, and an x-axis cross-section 806-a/806-b/806-c that represents horizontal variation of the illuminance of the wall.

Figures 9A, 9B, 9C:
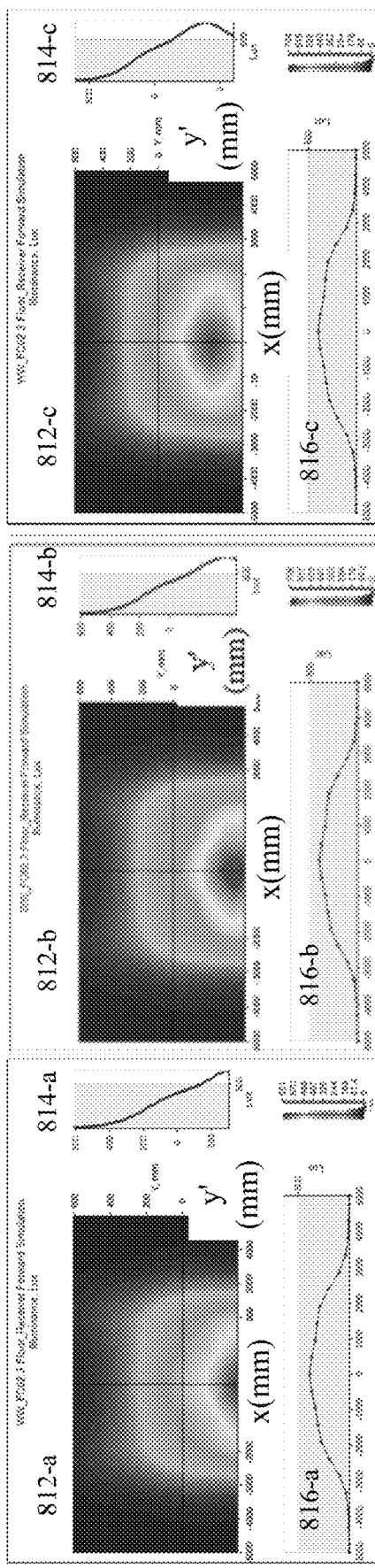

FIG. 9A/9B/9C shows an illuminance (x,y')-contour plot 812-a/812-b/812-c of a floor in front of the 10'-wall illuminated by the illumination system 600 in same configuration as the one associated with FIG. 8A/8B/8C. FIG. 9A/9B/9C also shows a y'-axis cross-section 814-a/814-b/814-c that represents variation of the illuminance orthogonal to the wall, and an x-axis cross-section 816-a/816-b/816-c that represents variation of the illuminance parallel to the wall. Here, y'=0 corresponds to a vertical plane that crosses the convex output surface of the light shaping optical article 340 of the illumination system 600. As such, in the coordinate system x-y', the wall is at y'=d'=−12"(or −310 mm) in the illuminance (x,y')-contour plot 812-a, at y'=d'=−18"(or −450 mm) in the illuminance (x,y')-contour plot 812-b, and at y'=d'=−24"(or −620 mm) in the illuminance (x,y')-contour plot 812-c.

In the example shown in FIGS. 8A and 9A, the setback distance is d'=12". Here, the light intensity on the floor is about 1150 lm, and the vertical variation of the illuminance corresponds to a uniformity of 5:1. In the example shown in FIGS. 8B and 9B, the setback distance is d'=18". Here, the light intensity on the floor is about 1600 lm, and the vertical variation of the illuminance corresponds to a uniformity of 3:1. In the example shown in FIGS. 8C and 9C, the setback distance is d'=24". Here, the light intensity on the floor is about 2050 lm, and the vertical variation of the illuminance corresponds to a uniformity of 2:1.

The foregoing experimental results indicate that the reflector element 584 beneficially reduces the light intensity on the floor by about 250 lm and boosts the illuminance in the vicinity of the ceiling for the illumination system 600 relative to the illumination system 400. Additionally, the reflector element 584 cuts off the view of the light shaping optical article 340 and, thus, advantageously causes a reduction in glare of the illumination system 600 relative to the illumination system 400. Also note that, this configuration of the illumination system 600 causes the floor illuminance to fade off from the wall (along the y'-axis), such that for y'≥0 (underneath the light shaping optical article 340 of the illumination system 600 and farther away from the wall) there is very little illumination.

Figures 10A, 10B, 10C:
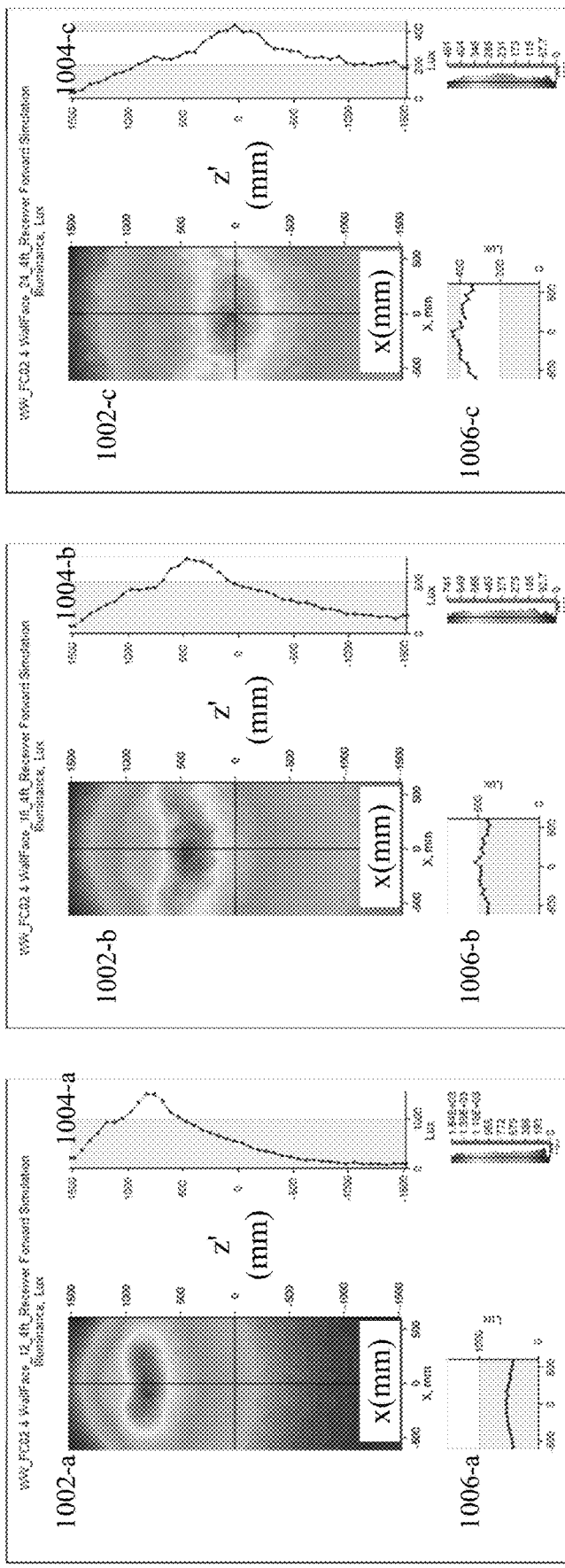

FIG. 10A/10B/10C shows an illuminance (x,z')-contour plot 1002-a/1002-b/1002-c of a 10'-wall illuminated by illumination system 600 in arrangement (i) while the light guide 330 of the light guide luminaire module 302 is tilted at a tilt angle θ=10° relative to the wall. Here, at least a portion of the reflector element 584 of the adjustable-orientation reflector 580 protrudes, outside of the housing 494, below a level of the ceiling. FIG. 10A/10B/10C also shows a z'-axis cross-section 1004-a/1004-b/1004-c that represents vertical variation of the illuminance of the wall, and an x-axis cross-section 1006-a/1006-b/1006-c that represents horizontal variation of the illuminance of the wall.

In the example shown in FIG. 10A, the setback distance is d'=12". Here, the light intensity on a floor in front of the wall (underneath the housing 494 of the illumination system 600) is about 750 lm, and the vertical variation of the illuminance corresponds to a uniformity of 10:1. In the example shown in FIG. 10B, the setback distance is d'=18". Here, the light intensity on the floor is about 1100 lm, and the vertical variation of the illuminance corresponds to a uniformity of 3:1. In the example shown in FIG. 10C, the setback distance is d'=24". Here, the light intensity on the floor is about 1550 lm, and the vertical variation of the illuminance corresponds to a uniformity of 2:1.

Figure 11A:
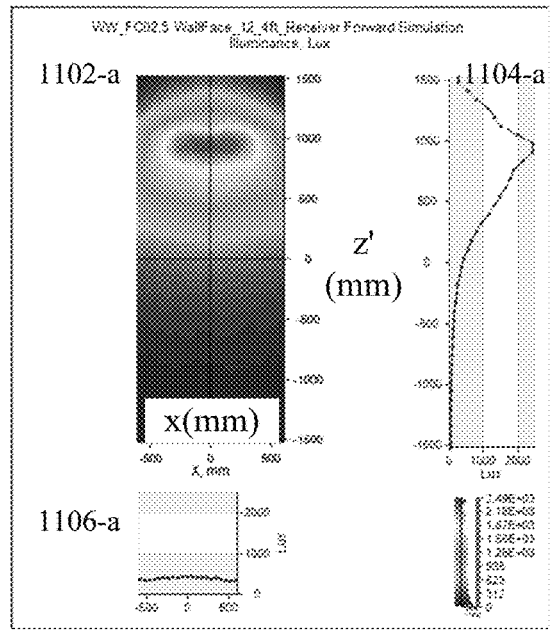
Figure 11B:
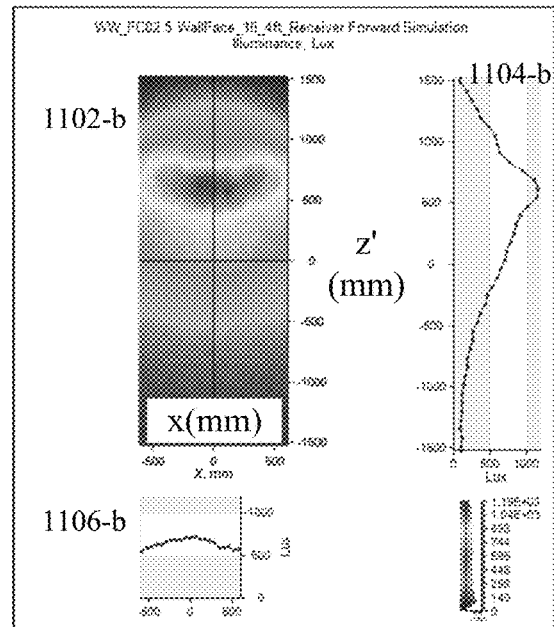
Figure 11C:
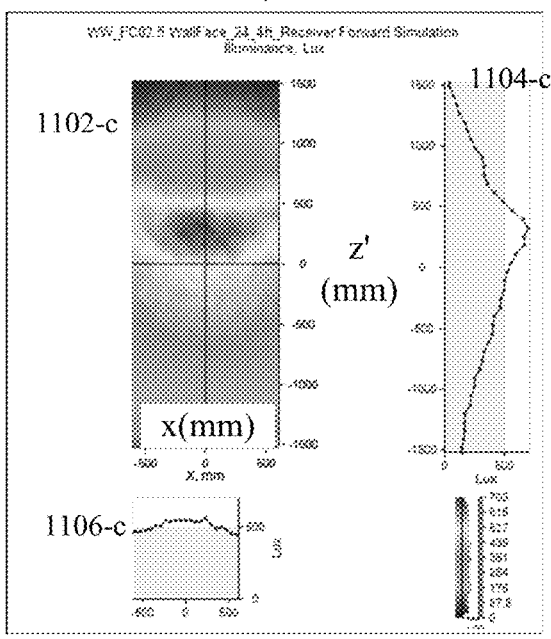
Figure 11D:
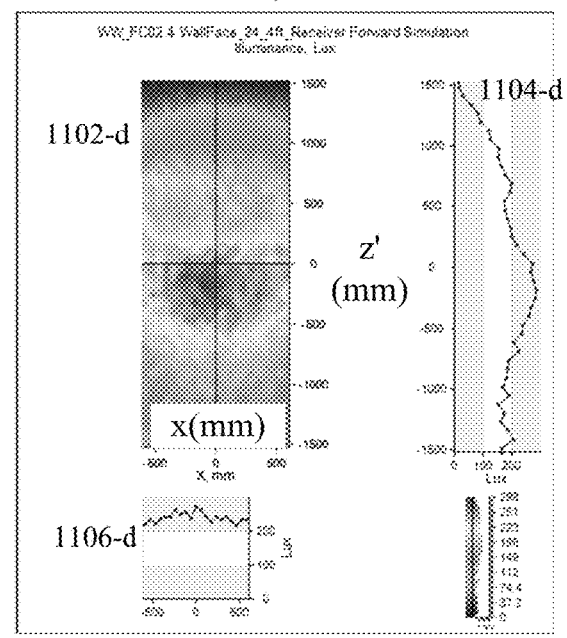

FIG. 11A/11B/11C/11D shows an illuminance (x,z')-contour plot 1102-a/1102-b/1102-c/1102-d of a 10'-wall illuminated by illumination system 600 in arrangement (i) while the light guide 330 of the light guide luminaire module 302 is tilted at a tilt angle 74 =14° relative to the wall. In a configuration associated with FIGS. 11A-11C, at least a portion of the reflector element 584 of the adjustable-orientation reflector 580 protrudes, outside of the housing 494, below a level of the ceiling. In another configuration associated with FIG. 11D, the entire reflector element 584 of the adjustable-orientation reflector 580 is contained inside the housing 494, above the level of the ceiling. FIG. 11A/11B/11C/11D also shows a z'-axis cross-section 1104-a/1104-b/1104-c/1104-d that represents vertical variation of the illuminance of the wall, and an x-axis cross-section 1106-a/1106-b/1106-c/1106-d that represents horizontal variation of the illuminance of the wall.

In the example shown in FIG. 11A, the setback distance is d'=12" and the reflector element 584 protrudes below a ceiling level. Here, the light intensity on a floor in front of the wall (underneath the housing 494 of the illumination system 600) is about 350 lm, and the vertical variation of the illuminance corresponds to a uniformity larger than 10:1. In the example shown in FIG. 11B, the setback distance is d'=18" and the reflector element 584 protrudes below the ceiling level. Here, the light intensity on the floor is about 600 lm, and the vertical variation of the illuminance corresponds to a uniformity of 8:1. In the example shown in FIG. 11C, the setback distance is d'=24" and the reflector element 584 protrudes below the ceiling level. Here, the light intensity on the floor is about 900 lm, and the vertical variation of the illuminance corresponds to a uniformity of 3:1. In the example shown in FIG. 11D, the setback distance is d'=24" and the reflector element 584 is fully recessed, above the ceiling level. Here, the light intensity on the floor is not significantly different relative to the light intensity corresponding to the configuration of the illumination system 600 associated with FIG. 11C. Also, the uniformity of the illuminance along the z'-axis is similar to the uniformity corresponding to the configuration of the illumination system 600 associated with FIG. 11C.

As such, when desired, the illumination system 600 can be used as a wall wash luminaire in a configuration for which the reflector element 584 is fully recessed, above the ceiling level, without sacrificing the uniformity of the illuminance of wall.

Figures 12A, 12B, 12C:
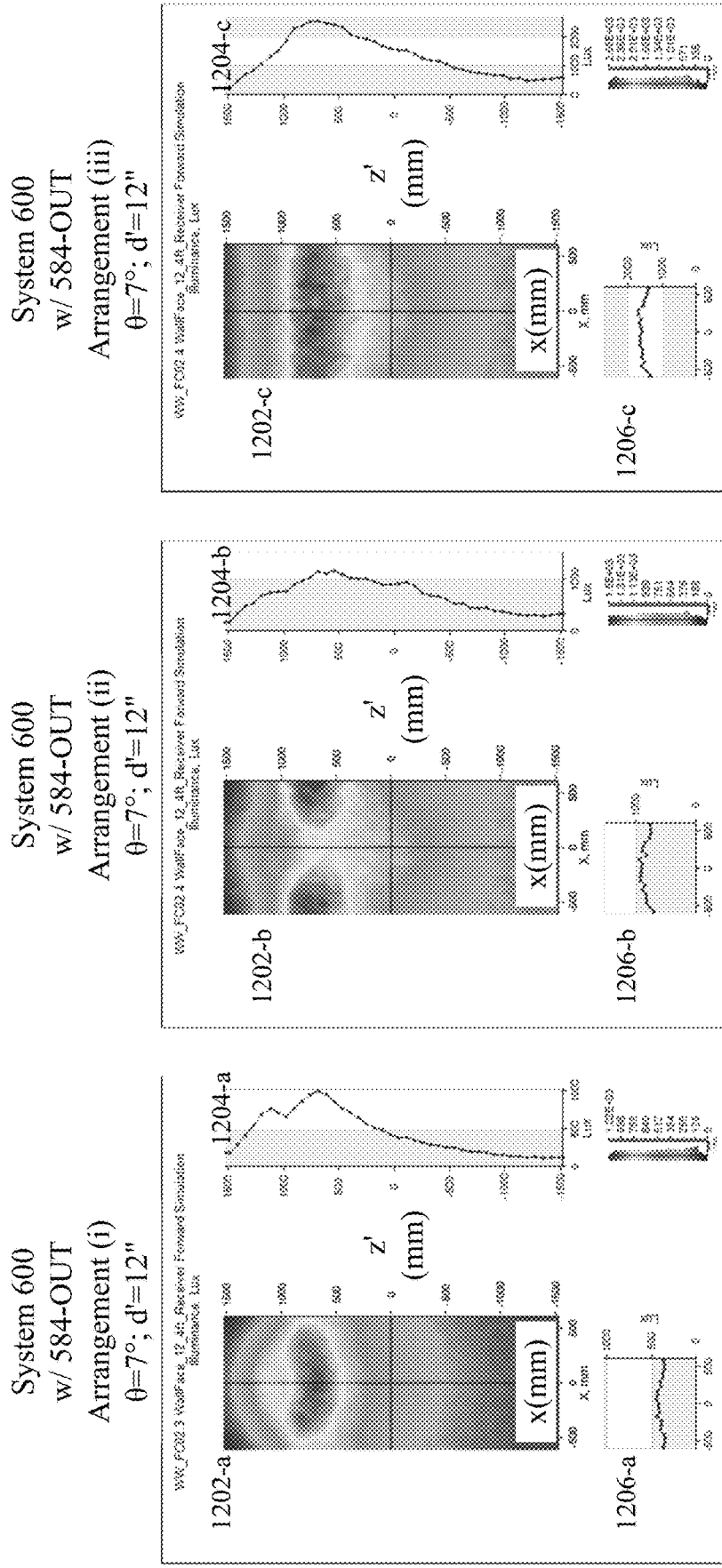
FIGS. 12A-12C, 13A-13C and 14A-14C show results of simulation of the wall wash luminaire of FIG. 6 in arrangements of FIGS. 4B, 4C and 4D, respectively.

FIG. 12A/12B/12C shows an illuminance (x,z')-contour plot 1202-a/1202-b/1202-c of a 10'-wall illuminated by illumination system 600 in which the light guide 330 of the light guide luminaire module 302 is tilted at a tilt angle θ=7° relative to the wall, when the setback distance is d'=12". Here, at least a portion of the reflector element 584 of the adjustable-orientation reflector 580 protrudes, outside of the housing 494, below a level of the ceiling. FIG. 12A/12B/12C also shows a z'-axis cross-section 1204-a/1204-b/1204-c that represents vertical variation of the illuminance of the wall through the center of the illumination system, and an x-axis cross-section 1206-a/1206-b/1206-c that represents horizontal variation of the illuminance of the wall at half height.

In the example shown in FIG. 12A, the illumination system 600 is configured in arrangement (i). Here, the vertical variation of the illuminance corresponds to a uniformity of 5:1. In the example shown in FIG. 12B, the illumination system 600 is configured in arrangement (ii). Here, the vertical variation of the illuminance corresponds to a uniformity of 4:1. In the example shown in FIG. 12C, the illumination system 600 is configured in arrangement (iii). Here, the vertical variation of the illuminance corresponds to a uniformity of 4:1.

Figures 13A, 13B, 13C:
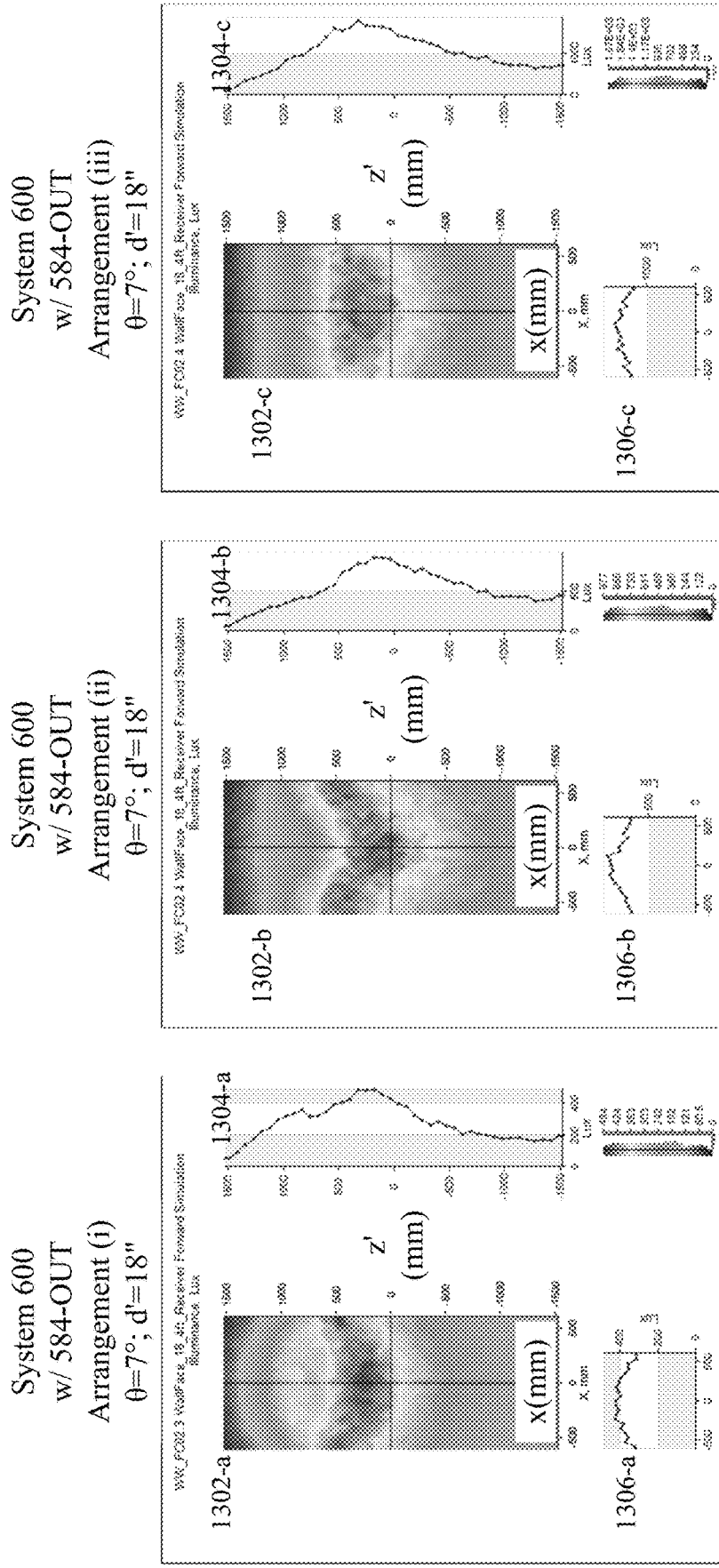

FIG. 13A/13B/13C shows an illuminance (x,z')-contour plot 1302-a/1302-b/1302-c of a 10'-wall illuminated by illumination system 600 in which the light guide 330 of the light guide luminaire module 302 is tilted at a tilt angle θ=7° relative to the wall, when the setback distance is d'=18". Here, at least a portion of the reflector element 584 of the adjustable-orientation reflector 580 protrudes, outside of the housing 494, below a level of the ceiling. FIG. 13A/13B/13C also shows a z'-axis cross-section 1304-a/1304-b/1304-c that represents vertical variation of the illuminance of the wall through the center of the illumination system, and an x-axis cross-section 1306-a/1306-b/1306-c that represents horizontal variation of the illuminance of the wall at half height.

In the example shown in FIG. 13A, the illumination system 600 is configured in arrangement (i). Here, the vertical variation of the illuminance corresponds to a uniformity of 3:1. In the example shown in FIG. 13B, the illumination system 600 is configured in arrangement (ii). Here, the vertical variation of the illuminance corresponds to a uniformity of 2:1. In the example shown in FIG. 13C, the illumination system 600 is configured in arrangement (iii). Here, the vertical variation of the illuminance corresponds to a uniformity of 2:1.

Figures 14A, 14B, 14C:
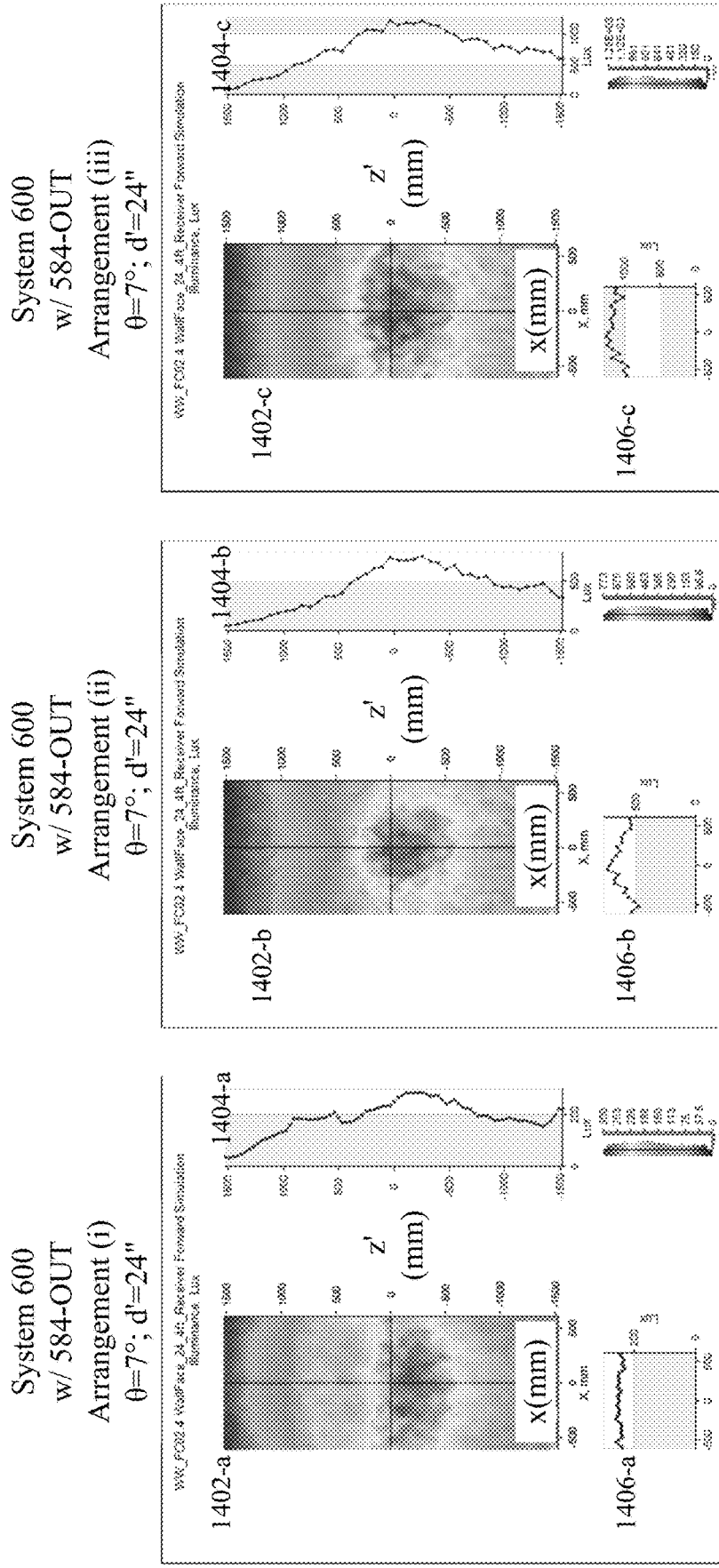

FIG. 14A/14B/14C shows an illuminance (x,z')-contour plot 1402-a/1402-b/1402-c of a 10'-wall illuminated by illumination system 600 in which the light guide 330 of the light guide luminaire module 302 is tilted at a tilt angle θ=7° relative to the wall, when the setback distance is d'=24". Here, at least a portion of the reflector element 584 of the adjustable-orientation reflector 580 protrudes, outside of the housing 494, below a level of the ceiling. FIG. 14A/14B/14C also shows a z'-axis cross-section 1404-a/1404-b/1404-c that represents vertical variation of the illuminance of the wall through the center of the illumination system, and an x-axis cross-section 1406-a/1406-b/1406-c that represents horizontal variation of the illuminance of the wall at half height.

In the example shown in FIG. 14A, the illumination system 600 is configured in arrangement (i). Here, the vertical variation of the illuminance corresponds to a uniformity of 3:1. In the example shown in FIG. 14B, the illumination system 600 is configured in arrangement (ii).

Here, the vertical variation of the illuminance corresponds to a uniformity of 3:1. In the example shown in FIG. 14C, the illumination system 600 is configured in arrangement (iii). Here, the vertical variation of the illuminance corresponds to a uniformity of 2:1.

Some components of light guide luminaire modules used in the illumination devices 300 and 500 are described below.

(vii) Components of Light Guide Luminaire Modules

Referring again to FIGS. 3A-3B, a light guide luminaire module 302 includes a substrate 305 having a plurality of LEEs 310 distributed along a first surface of the substrate 305. The substrate 305 with the LEEs 310 is disposed at a first (e.g., upper) edge of a light guide 330. Sections through the light guide luminaire module 302 parallel to the y-z plane are referred to as the "cross-section" or "cross-sectional plane" of the light guide luminaire module. Also, light guide luminaire module 302 extends along the x-direction, so this direction is referred to as the "longitudinal" direction of the light guide luminaire module. Implementations of the light guide luminaire module 302 can have a plane of symmetry parallel to the x-z plane, be curved or otherwise shaped. This is referred to as the "symmetry plane" of the luminaire module.

Multiple LEEs 310 are disposed on the first surface of the substrate 305. For example, the plurality of LEEs 310 can include multiple white LEDs. In the example illustrated in FIG. 3B, the LEEs 310 are optically coupled with one or more optical couplers 320. A light shaping optical article 340 is disposed at second (e.g., lower) edge of light guide 330.

Substrate 305, light guide 330, and light shaping optical article 340 extend a length L along the x-direction, so that the light guide luminaire module 302 is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 310 on the substrate 305 will generally depend, inter alia, on the length L, where more LEEs are used for longer luminaire modules. In some implementations, the plurality of LEEs 310 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the light guide luminaire module 302 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the light guide luminaire module 302. In some implementations, a heat-sink can be attached to the substrate 305 to extract heat emitted by the plurality of LEEs 310. The heat-sink can be disposed on a surface of the substrate 305 opposing the side of the substrate 305 on which the LEEs 310 are disposed. The light guide luminaire module 302 can include one or multiple types of LEEs, for example one or more subsets of LEEs in which each subset can have different color or color temperature.

Optical coupler 320 includes one or more solid pieces of transparent optical material (e.g., a glass material or a transparent optical plastic, such as polycarbonate or acrylic) having side surfaces positioned to reflect light from the LEEs 310 towards the light guide 330. In general, side surfaces are shaped to collect and at least partially collimate light emitted from the LEEs. In the y-z cross-sectional plane, side surfaces can be straight or curved. Examples of curved surfaces include surfaces having a constant radius of curvature, parabolic or hyperbolic shapes. In some implementations, side surfaces are coated with a highly reflective material (e.g., a reflective metal, such as aluminum or silver), to provide a highly reflective optical interface. The cross-sectional profile of optical coupler 320 can be uniform along the length L of light guide luminaire module 302. Alternatively, the cross-sectional profile can vary. For example, side surfaces can be curved out of the y-z plane. Depending on the illumination application, mitigation of glare from the output light within the x-z plane can be important. As such the optical couplers 320 may be configured to provide respective optical power with the x-z plane.

The exit aperture of the optical coupler 320 adjacent the upper edge of the light guide is optically coupled to edge to facilitate efficient coupling of light from the optical coupler 320 into light guide 330. For example, the surfaces of a solid coupler and a solid light guide can be attached using a material that substantially matches the refractive index of the material forming the optical coupler 320 or light guide 330 or both (e.g., refractive indices across the interface are different by 2% or less.) The optical coupler 320 can be affixed to light guide 330 using an index matching fluid, grease, or adhesive. In some implementations, optical coupler 320 is fused to light guide 330 or they are integrally formed from a single piece of material (e.g., coupler and light guide may be monolithic and may be made of a solid transparent optical material).

Light guide 330 is formed from a piece of transparent material (e.g., glass material such as BK7, fused silica or quartz glass, or a transparent plastic, such as polycarbonate or acrylic) that can be the same or different from the material forming optical couplers 320. Light guide 330 extends length L in the x-direction, has a uniform thickness T in the y-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 330 from optical coupler 320 (with an angular range 125) reflects off the planar surfaces of the light guide by TIR and spatially mixes within the light guide. The mixing can help achieve illuminance and/or color uniformity, along the y-axis, at the distal portion of the light guide at the light shaping optical article 340. The depth, D, of light guide 330 can be selected to achieve adequate uniformity at the exit aperture of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 320 are designed to restrict the angular range of light entering the light guide 330 (e.g., to within +/−40 degrees) so that at least a substantial amount of the light (e.g., 95% or more of the light) is optically coupled into spatial modes in the light guide 330 that undergoes TIR at the planar surfaces. Light guide 330 can have a uniform thickness T, which is the distance separating two planar opposing surfaces of the light guide. Generally, T is sufficiently large so the light guide has an aperture at first (e.g., upper) surface sufficiently large to approximately match (or exceed) the exit aperture of optical coupler 320. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

While optical coupler 320 and light guide 330 are formed from solid pieces of transparent optical material, hollow structures are also possible. For example, the optical coupler 320 or the light guide 330 or both may be hollow with reflective inner surfaces rather than being solid. As such, material cost can be reduced and absorption in the light guide can be mitigated. A number of specular reflective materials may be suitable for this purpose including materials such as 3M Vikuiti™ or Miro IV™ sheet from Alanod Corporation where greater than 90% of the incident light can be efficiently guided to the optical extractor.

The light shaping optical article of the light guide luminaire module 302 is described in detail above, in connection with FIGS. 1A-1D and 2A-2F.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. A lighting device comprising:
   one or more white light emitting diodes (LEDs); and
   a solid optic having a cross-sectional profile comprising:
      an input interface arranged to receive white light emitted by the one or more white LEDs;
      a convex output surface opposite the input interface;
      a concave first side surface extending between the input interface and the convex output surface;
      and a second side surface opposite the concave first side surface extending from between input interface to the convex output surface, wherein
   the concave first side surface and the convex output surface are shaped and arranged such that, when the solid optic receives input light at the input interface having an input angular range in a plane of the cross-sectional profile, the solid optic guides the light to and emits the light from the output surface in an output angular range in the plane, where a prevalent propagation direction of output light in the output angular range is tilted toward the second side surface relative to a prevalent propagation direction of input light in the input angular range, and
   the solid optic has an elongate extension extending from the plane of the cross-sectional profile.

2. The lighting device of claim 1 further comprising a coupler coupled with the input interface of the solid optic and the one or more white LEDs, the coupler arranged to receive light emitted by the one or more white LEDs and provide light to the input interface of the solid optic.

3. The lighting device of claim 2, wherein the coupler is configured so that a divergence of the light provided to the input interface of the solid optic is smaller than a divergence of the light received from the one or more white LEDs.

4. The lighting device of claim 3, wherein the coupler is configured as a hollow structure with reflective inner side surfaces.

5. The lighting device of claim 1, wherein the second side surface of the solid optic is planar.

6. The lighting device of claim 1, wherein the solid optic is configured so that a divergence of output light in the output angular range is smaller than a divergence of input light in the input angular range.

7. The lighting device of claim 1, wherein the solid optic is configured so that a tilt angle α between the prevalent propagation direction of output light in the output angular range and the prevalent propagation direction of input light in the input angular range is in a tilt range of 3° to 30°.

8. The lighting device of claim 7, wherein the tilt range is 10° to 20°.

9. The lighting device of claim 1, wherein the concave first side surface and the second side surface of the solid optic are shaped and arranged relative to each other such that, for a given divergence of the input angular range, the input light received by the solid optic reaches the convex output surface either directly or via a single reflection off the concave first side surface or the second side surface of the solid optic.

10. The lighting device of claim 1, wherein the convex output surface of the solid optic includes a diffusion pattern.

11. The lighting device of claim 1, further comprising a diffusive film attached to the convex output surface of the solid optic.

12. The lighting device of claim 1, wherein the solid optic comprises plastic material.

13. The lighting device of claim 1, wherein a separation between the concave first side surface and the second side surface of the solid optic at the input interface is less than 20 mm.

14. The lighting device of claim 13, wherein the separation is less than 10 mm.

15. The lighting device of claim 1, wherein a separation between the input interface and the convex output surface of the solid optic is less than 50 mm.

16. The lighting device of claim 15, wherein the separation between the input interface and the convex output surface of the solid optic is less than 25 mm.

17. The lighting device of claim 1, wherein the elongate extension of the solid optic is perpendicular to the plane of the cross-sectional profile.

18. A light shaping optical article comprising:
   a hollow structure having an input aperture and an exit aperture, the hollow structure having inner surfaces extending between the input and exit apertures and configured to receive light at the input aperture and provide light at the exit aperture; and a solid optic having a cross-sectional profile comprising:
   an input interface;
   a convex output surface opposite the input interface;
   a concave first side surface extending between the input interface and the convex output surface;
   and a second side surface opposite the concave first side surface extending from between input interface to the convex output surface, wherein
the concave first side surface and the convex output surface are shaped and arranged such that, when the solid optic receives input light at the input interface having an input angular range in a plane of the cross-sectional profile, the solid optic guides the light to and emits the light from the output surface in an output angular range in the plane, where a prevalent propagation direction of output light in the output angular range is tilted toward the second side surface relative to a prevalent propagation direction of input light in the input angular range, and
the solid optic has an elongate extension extending from the plane of the cross-sectional profile, and the input interface of the solid optic is coupled with the exit aperture of the hollow structure.

* * * * *